United States Patent
Stewart

(10) Patent No.: US 8,876,216 B2
(45) Date of Patent: Nov. 4, 2014

(54) DUMP TRAILER

(75) Inventor: Larry L. Stewart, Stillwater, OK (US)

(73) Assignee: All Right Steel, LLC, Cushing, OK (US)

( * ) Notice: Subject to any disclaimer, the term of this patent is extended or adjusted under 35 U.S.C. 154(b) by 0 days.

(21) Appl. No.: 13/544,511

(22) Filed: Jul. 9, 2012

(65) Prior Publication Data

US 2012/0280557 A1 Nov. 8, 2012

Related U.S. Application Data

(63) Continuation-in-part of application No. 13/126,807, filed as application No. PCT/US2011/026270 on Feb. 25, 2011, now Pat. No. 8,215,717.

(60) Provisional application No. 61/308,743, filed on Feb. 26, 2010.

(51) Int. Cl.
 *B60P 1/28* (2006.01)
 *B60P 1/12* (2006.01)

(52) U.S. Cl.
 CPC ........................................ *B60P 1/12* (2013.01)
 USPC ............................................................ 298/11

(58) Field of Classification Search
 USPC ............ 298/12, 11, 2, 17 R, 17.5, 17.8, 17 T; 280/47.17, 47.18, 47.26; 414/482
 See application file for complete search history.

(56) References Cited

U.S. PATENT DOCUMENTS

| 595,056 | A | | 12/1897 | French |
|---|---|---|---|---|
| 1,942,319 | A | | 1/1934 | Wright |
| 2,786,590 | A | * | 3/1957 | Edwards et al. ............... 414/477 |
| 3,977,726 | A | | 8/1976 | Prestayko |
| 3,985,253 | A | | 10/1976 | Kannady et al. |
| 4,511,181 | A | | 4/1985 | Schantz |
| 4,627,780 | A | | 12/1986 | Munz |

(Continued)

FOREIGN PATENT DOCUMENTS

| GB | 690579 | 4/1953 |
|---|---|---|
| GB | 1426069 | 2/1976 |
| WO | WO2010004615 | 1/2010 |

OTHER PUBLICATIONS

ATV Equipment & Accessories, Jan. 19, 2010 www.horsestalls.com/atvequipment.htm.

(Continued)

*Primary Examiner* — Glenn Dayoan
*Assistant Examiner* — Sunsurraye Westbrook
(74) *Attorney, Agent, or Firm* — McAfee & Taft

(57) ABSTRACT

A towable dump trailer is provided. The towable dump trailer comprises a first, second and third frame. The first frame comprises one or more sets of wheels. The second frame is attached to the tow vehicle and can be displaced horizontally relative to the first frame by the towing vehicle moving rearward or forward. The third frame provides a support frame for the trailer bed. The dump trailer is operated by immobilizing the first frame and causing the second frame to move horizontally relative to the first frame. This horizontal displacement causes the third frame to rotate as a result of one or more rear torque arms translating the horizontal movement to rotational movement. The dump trailer can be configured to provide a dumping action by either forward or rearward horizontal displacement of the second frame relative to the first frame.

28 Claims, 33 Drawing Sheets

(56) References Cited

U.S. PATENT DOCUMENTS

| | | | |
|---|---|---|---|
| 4,639,043 A | | 1/1987 | Morrisette |
| 4,647,110 A | | 3/1987 | McKee |
| 4,711,499 A | | 12/1987 | Fortin |
| 4,840,532 A | | 6/1989 | Galbreath |
| 4,889,390 A | * | 12/1989 | Campbell ............ 298/5 |
| 4,968,096 A | | 11/1990 | Chattin |
| 5,452,942 A | | 9/1995 | Brooks |
| 5,544,944 A | * | 8/1996 | Keech ............... 298/5 |
| 5,779,431 A | | 7/1998 | Alm et al. |
| 6,099,232 A | | 8/2000 | Dixon et al. |
| 6,238,166 B1 | * | 5/2001 | Collier ............ 414/436 |
| 6,755,479 B1 | | 6/2004 | Meeks |
| 6,817,825 B1 | | 11/2004 | O'Hagen |
| 6,851,756 B2 | * | 2/2005 | Pieschel ............ 298/2 |
| 7,390,065 B2 | | 6/2008 | Pieschel et al. |
| 7,431,143 B2 | | 10/2008 | Hanhinen et al. |
| 7,552,818 B2 | | 6/2009 | Makinen et al. |
| 2005/0253445 A1 | | 11/2005 | Beller et al. |
| 2007/0158162 A1 | | 7/2007 | Makinen et al. |
| 2008/0056868 A1 | | 3/2008 | Nitereka et al. |
| 2008/0211289 A1 | | 9/2008 | Beller et al. |

OTHER PUBLICATIONS

CAM Trailers, Jan. 21, 2010, www.allprowest.com.

* cited by examiner

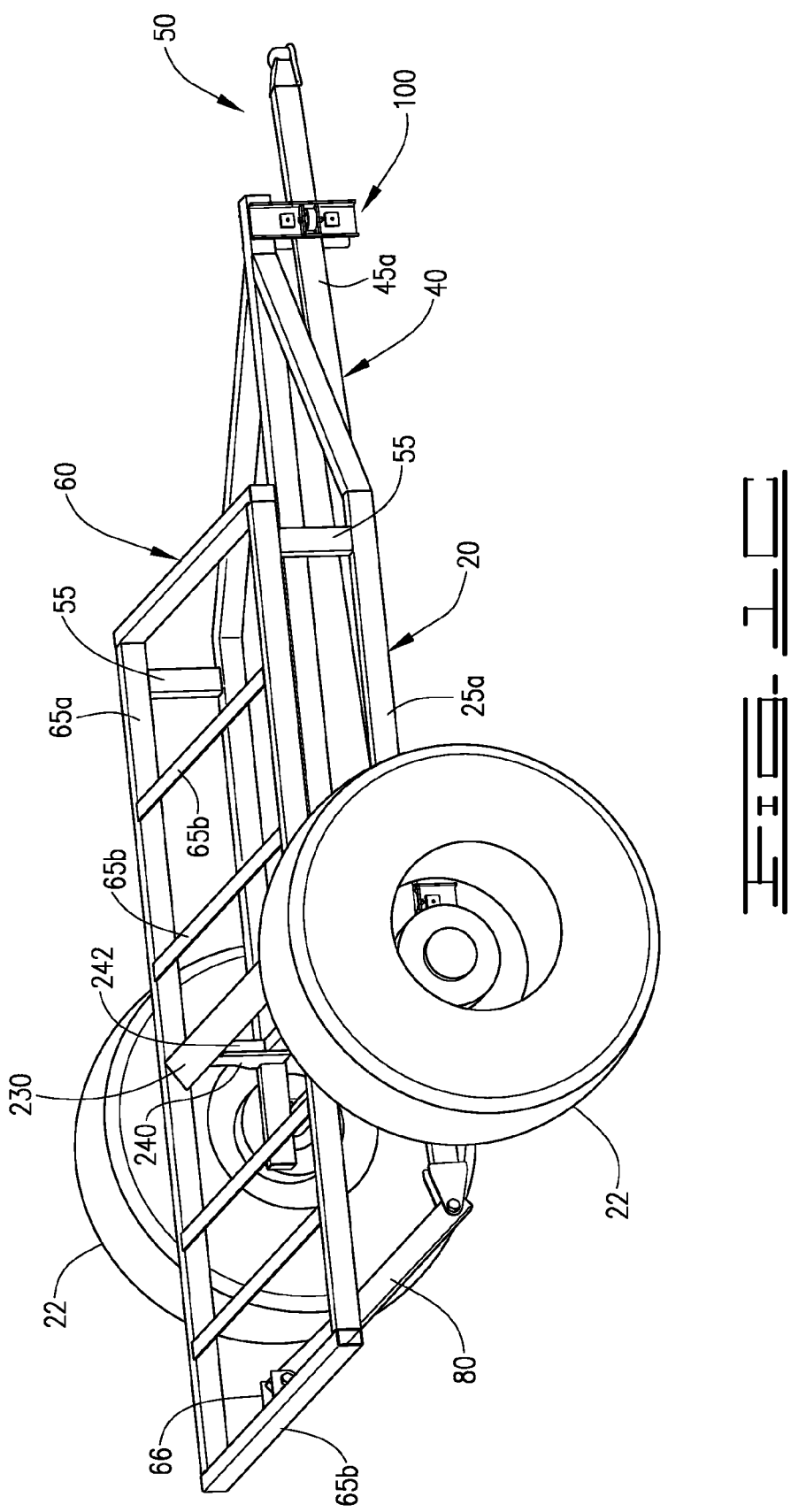

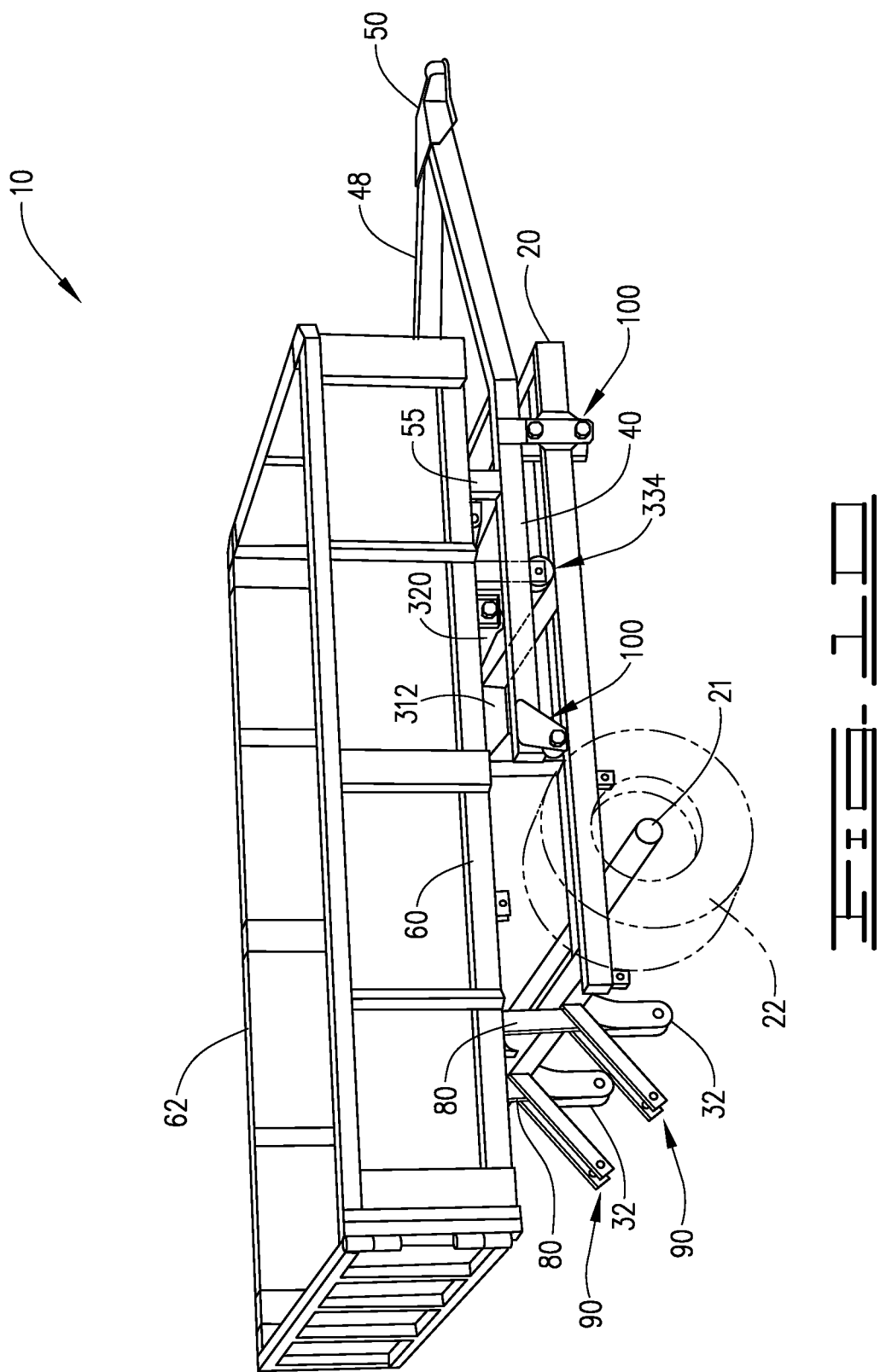

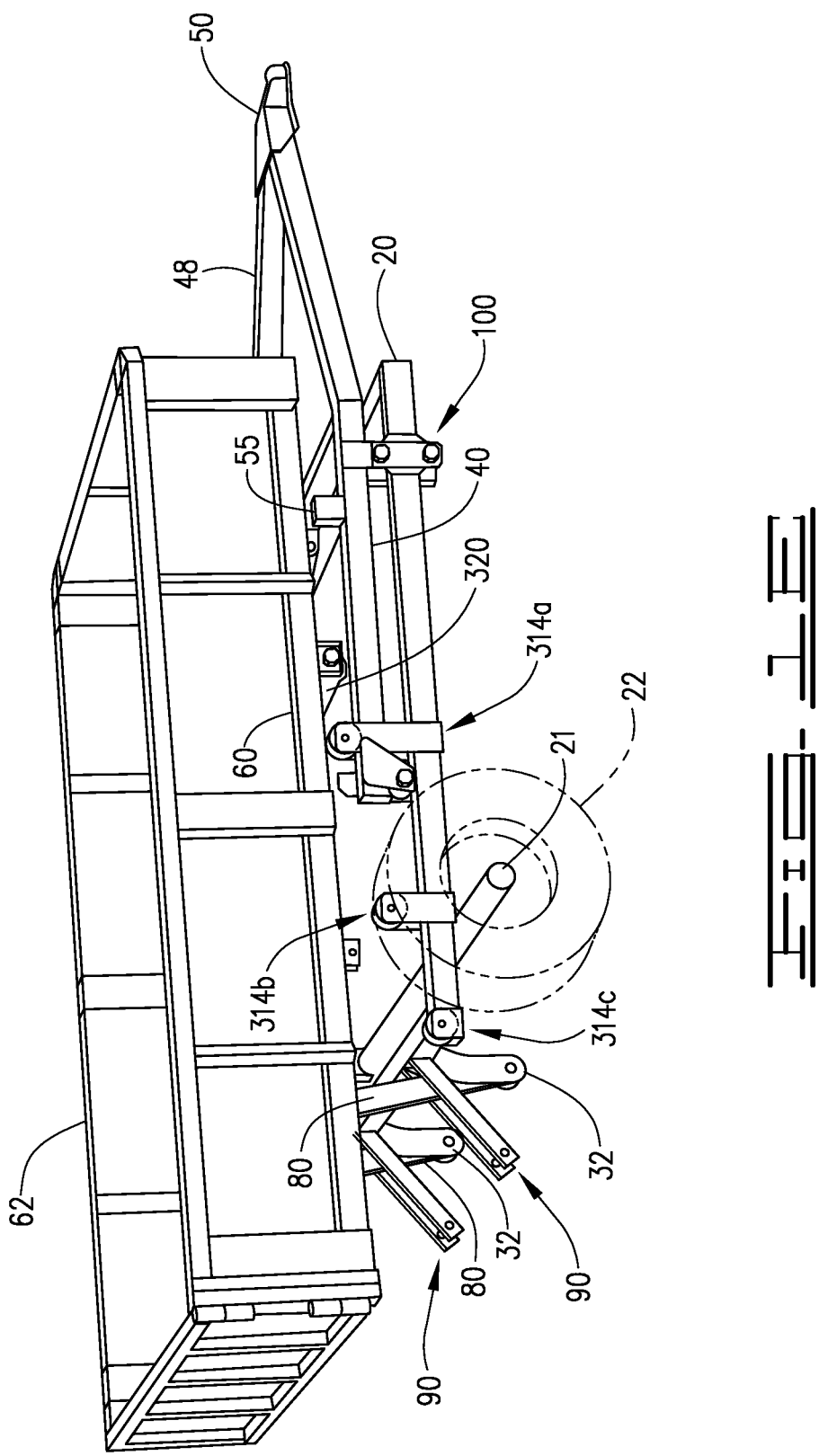

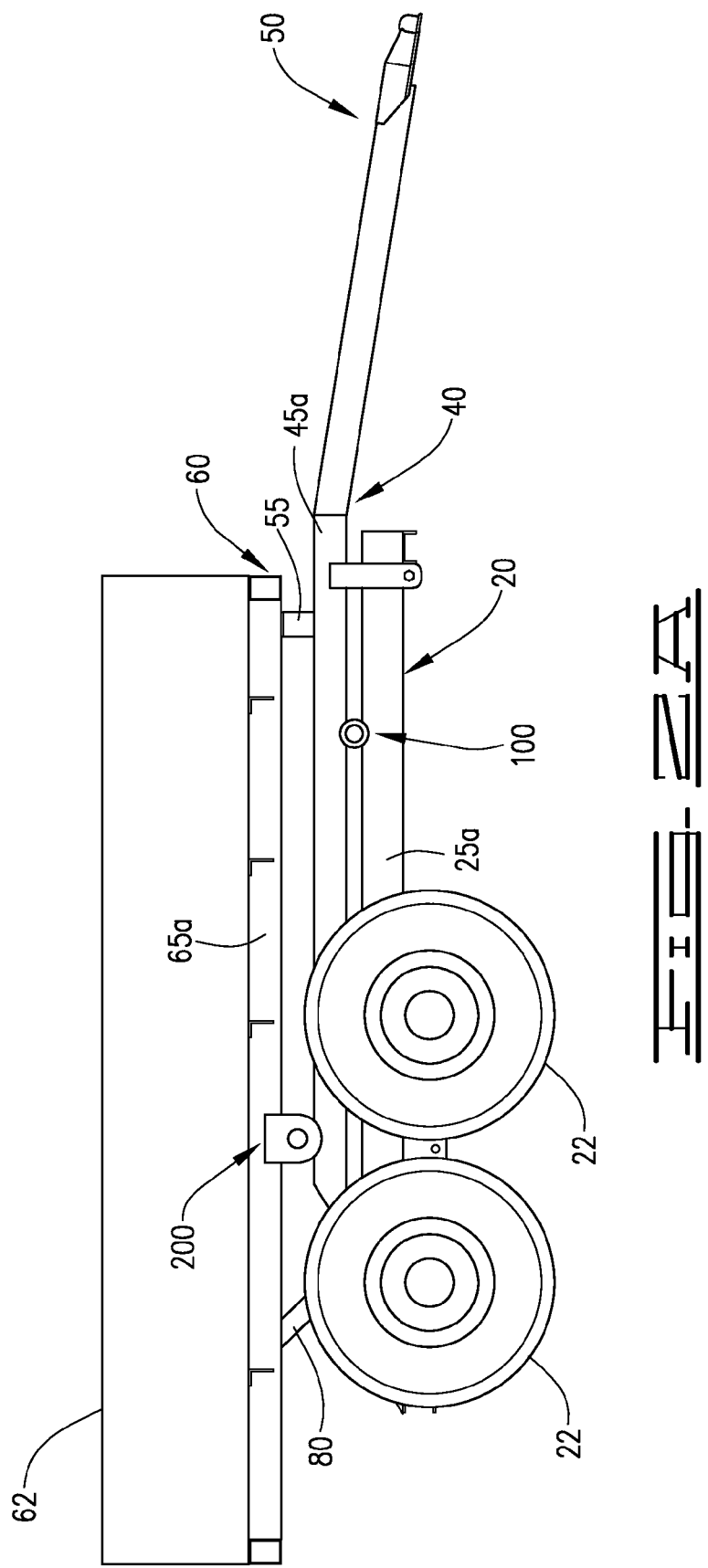

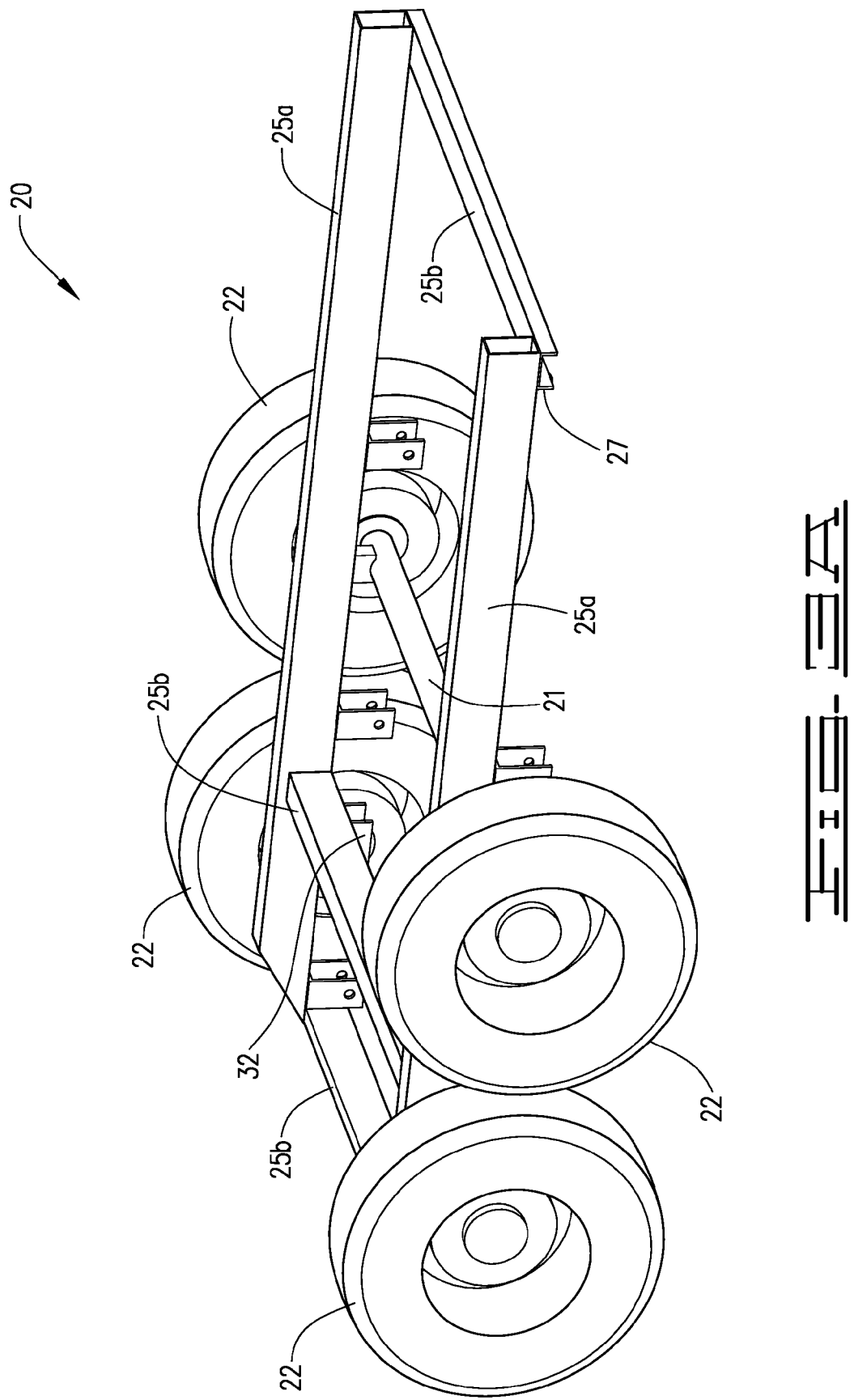

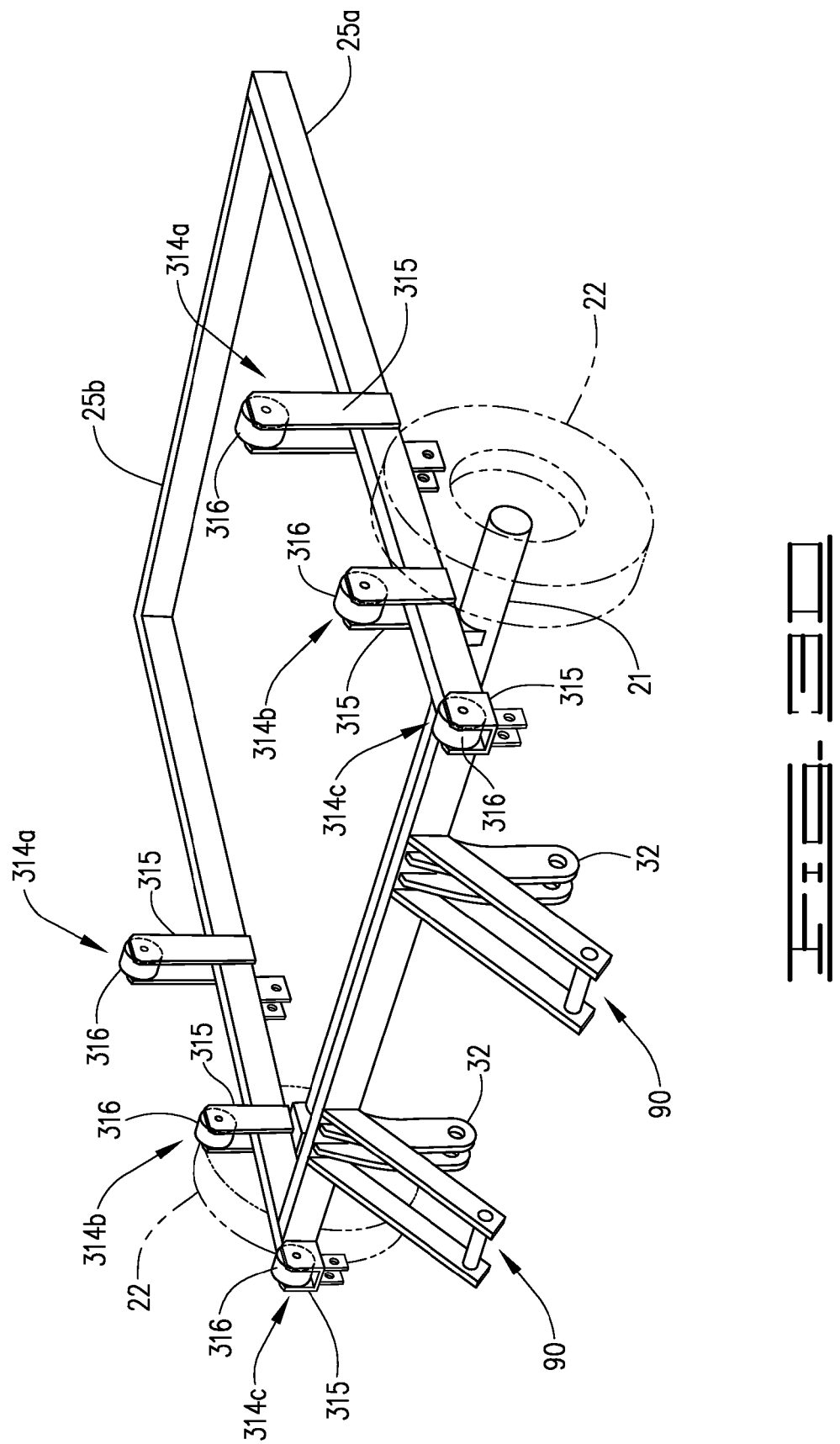

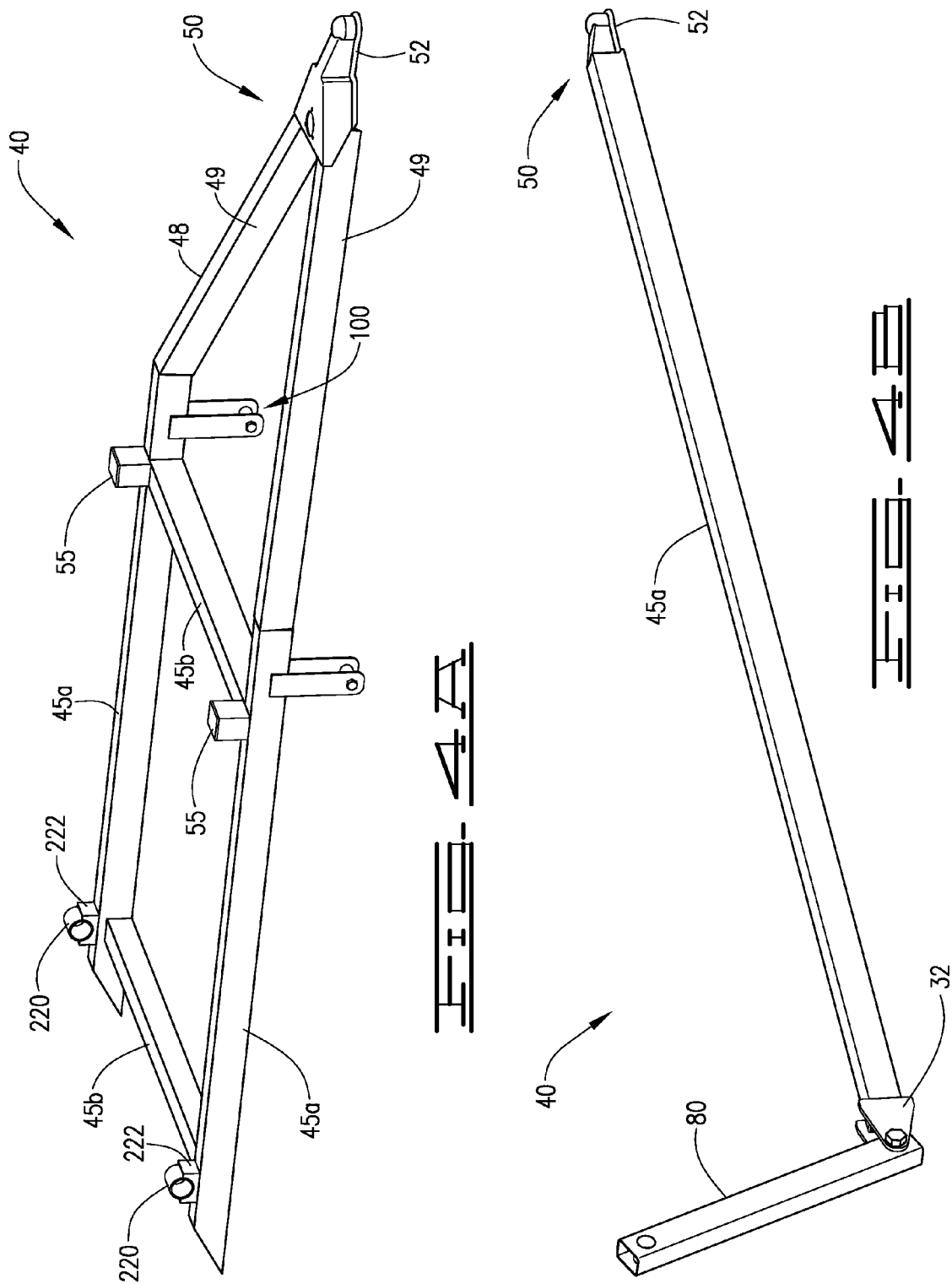

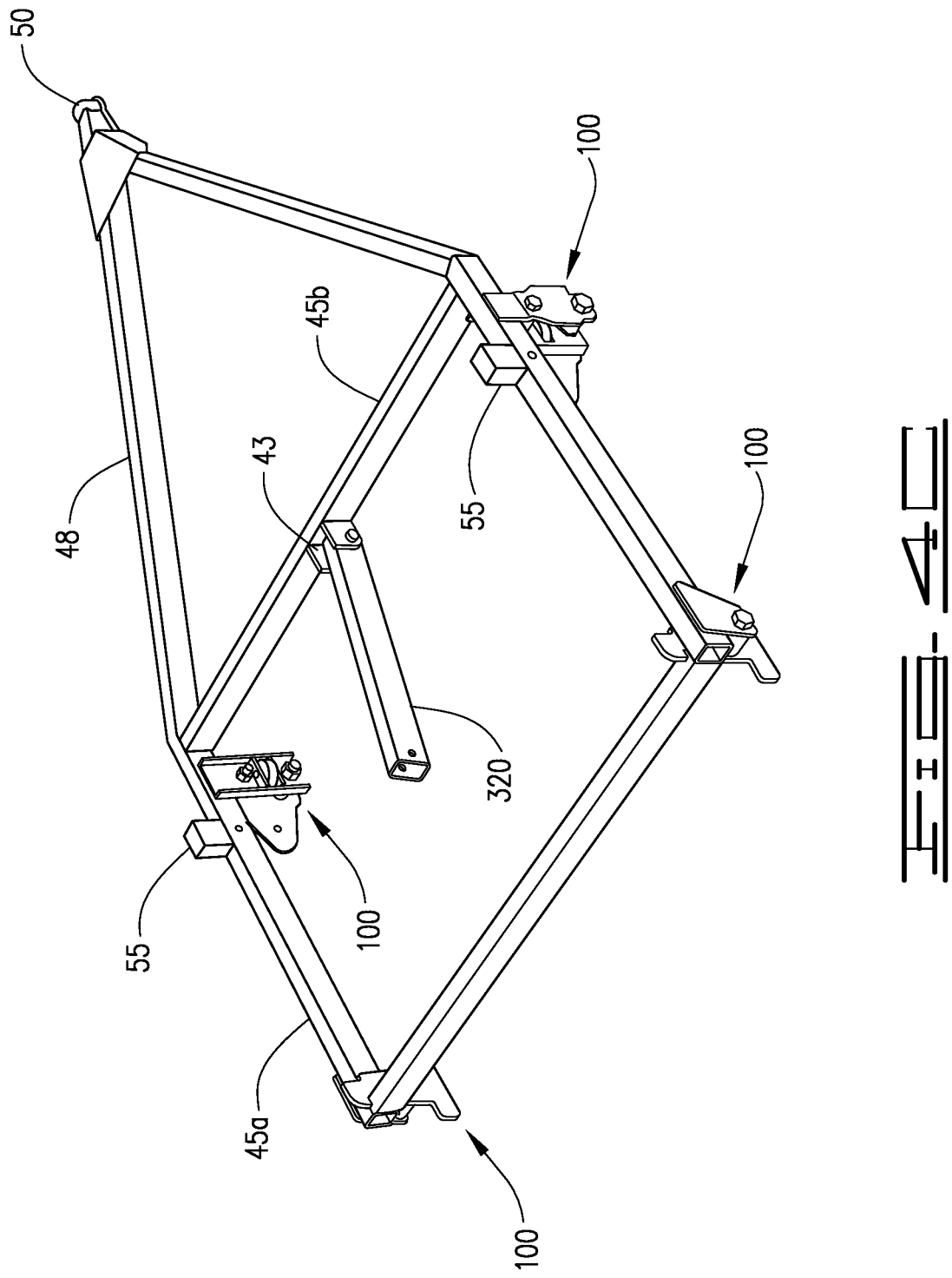

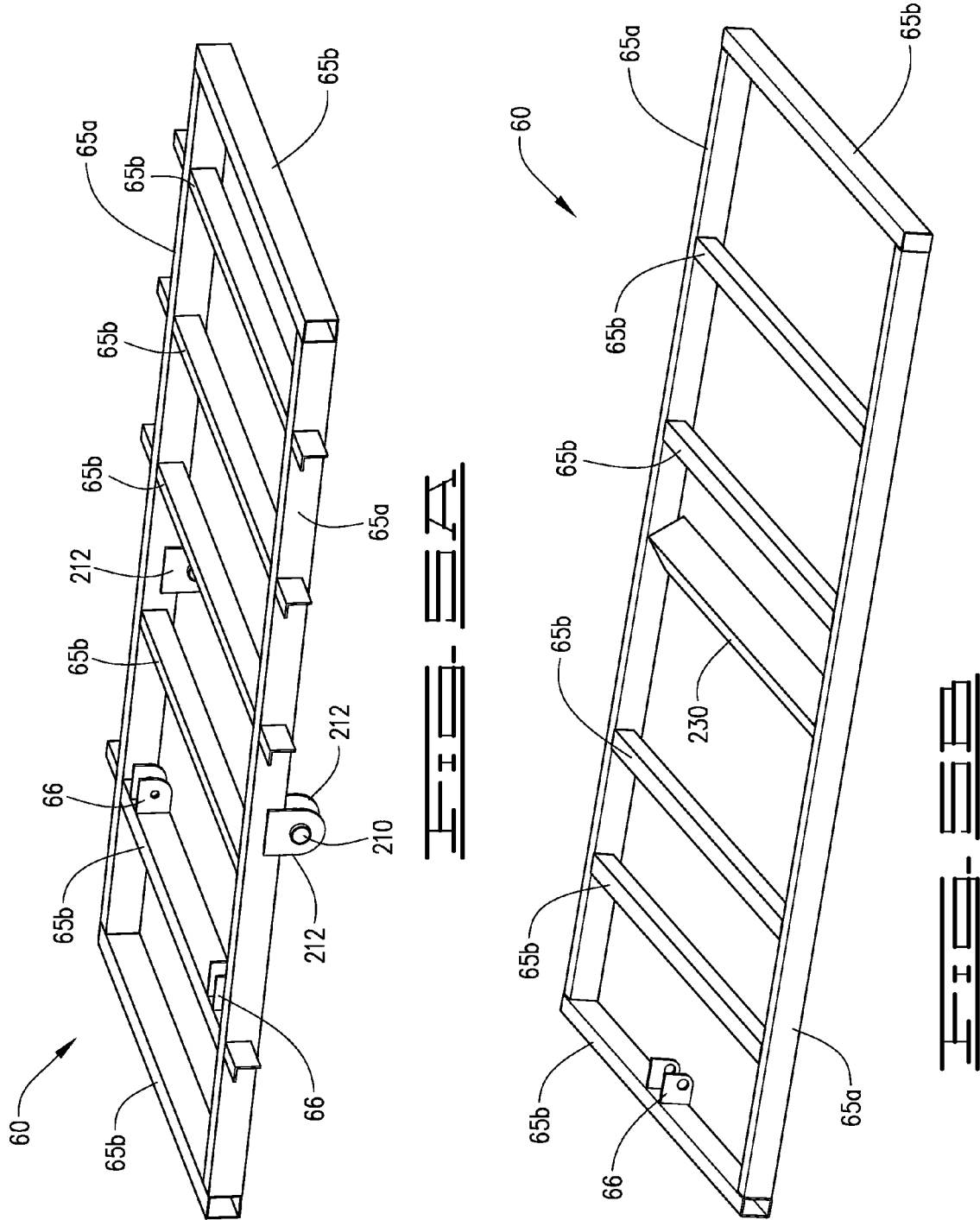

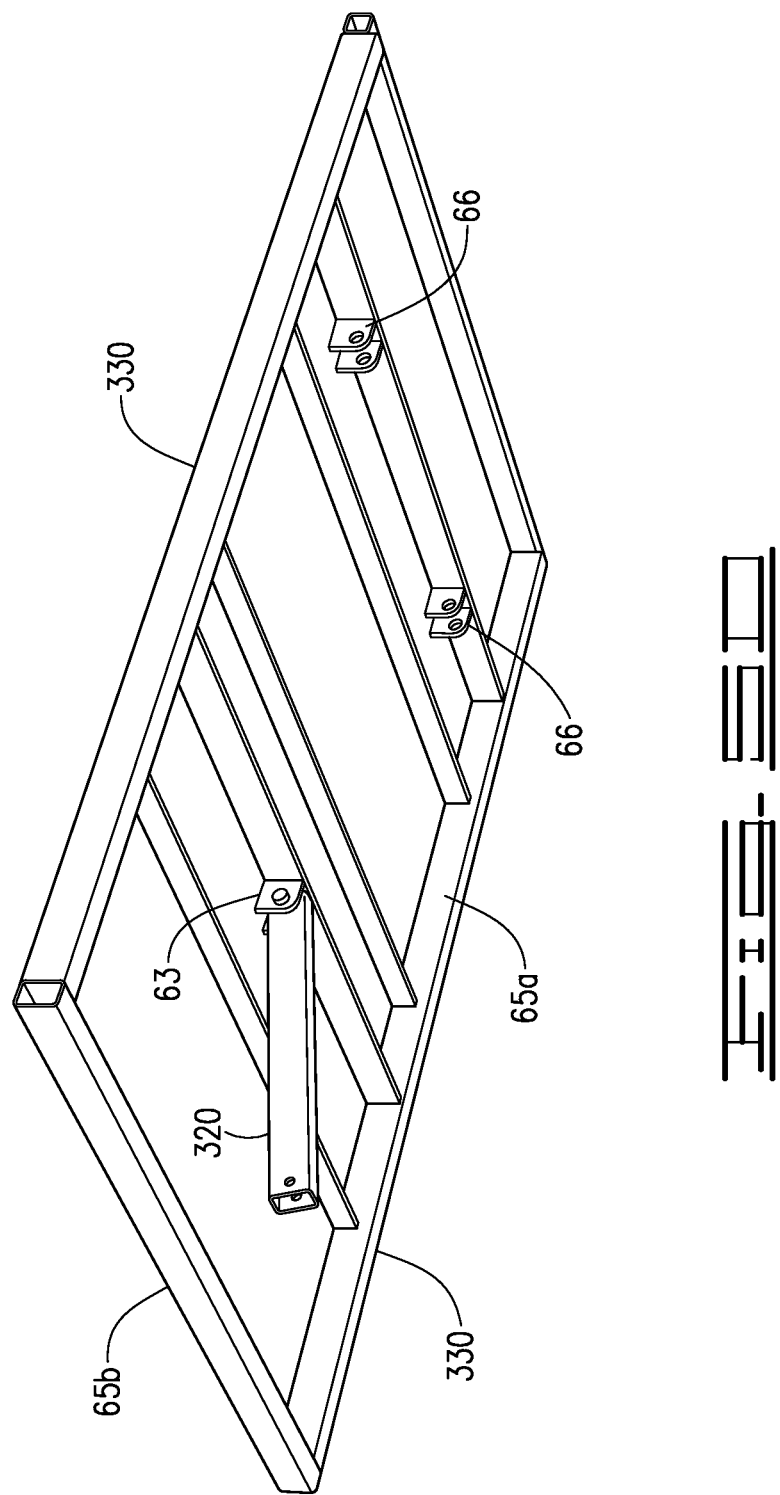

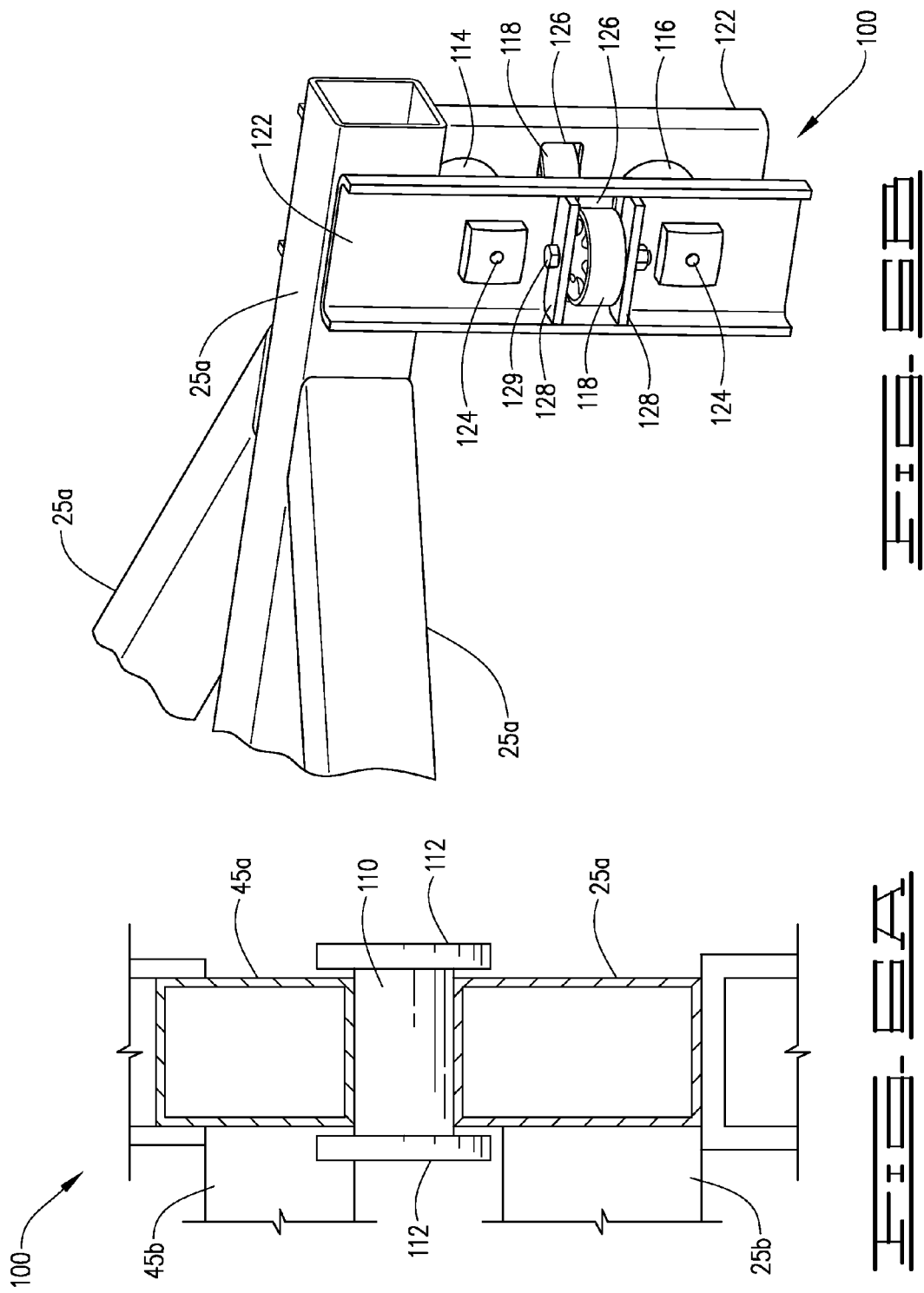

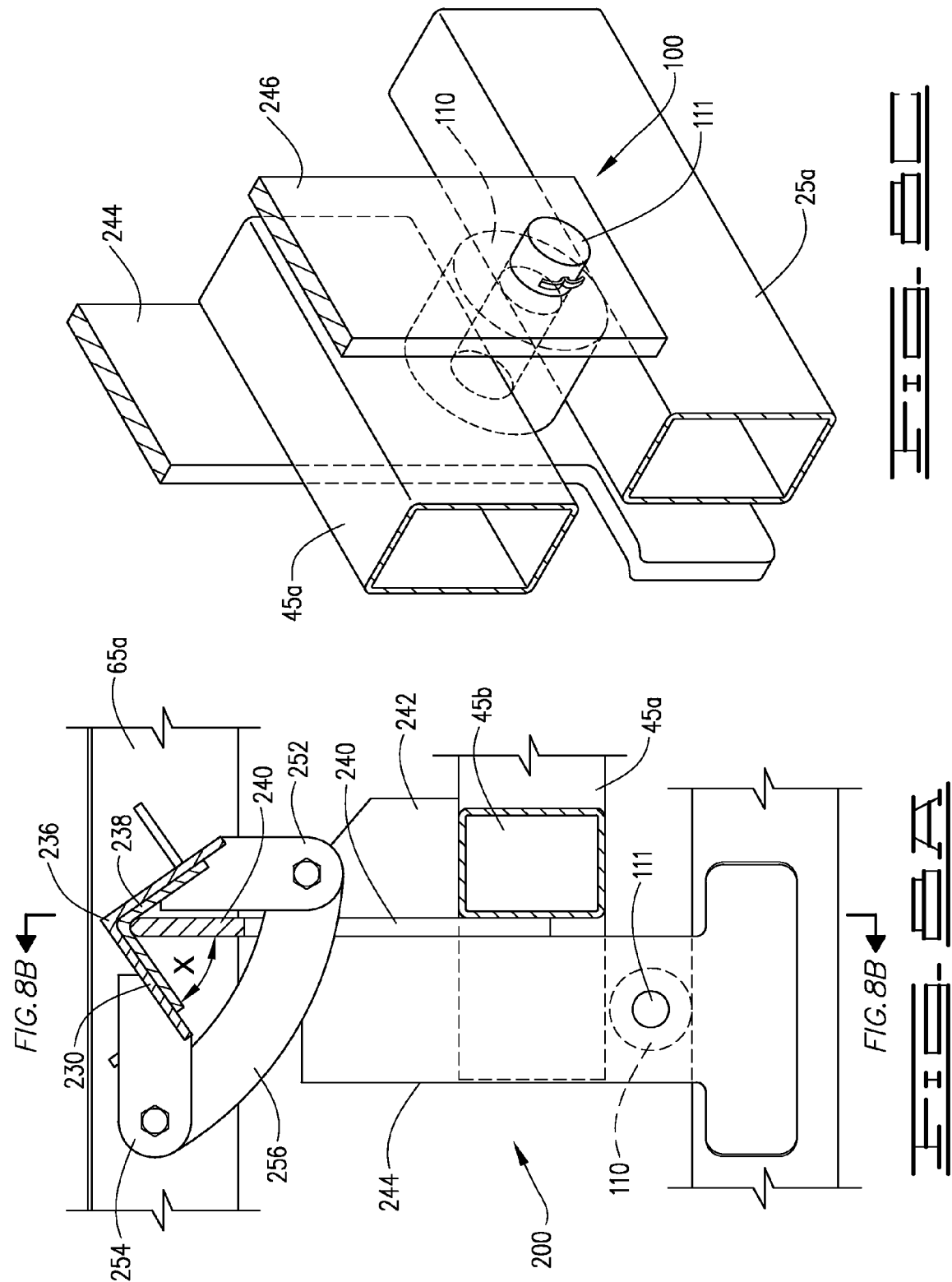

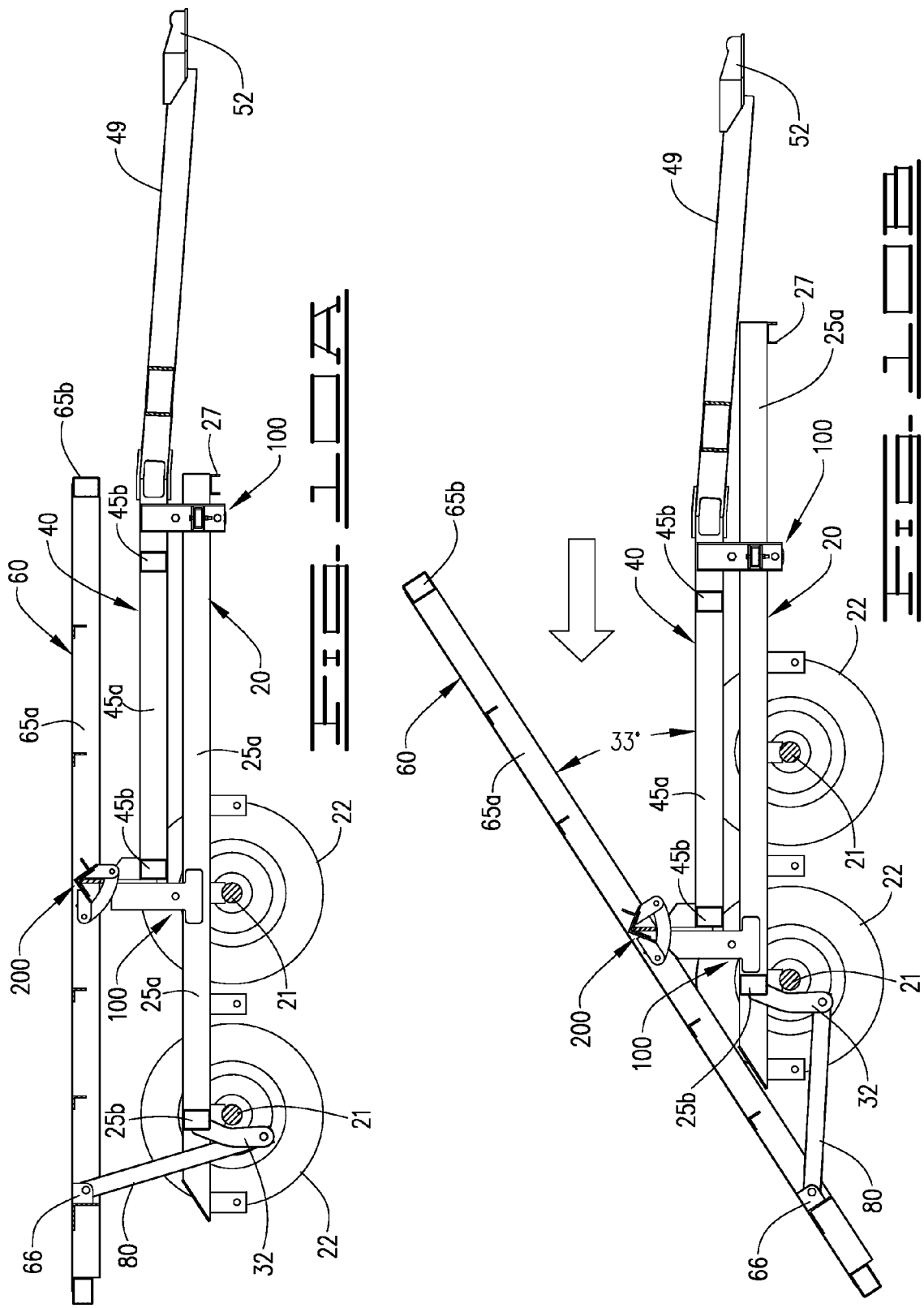

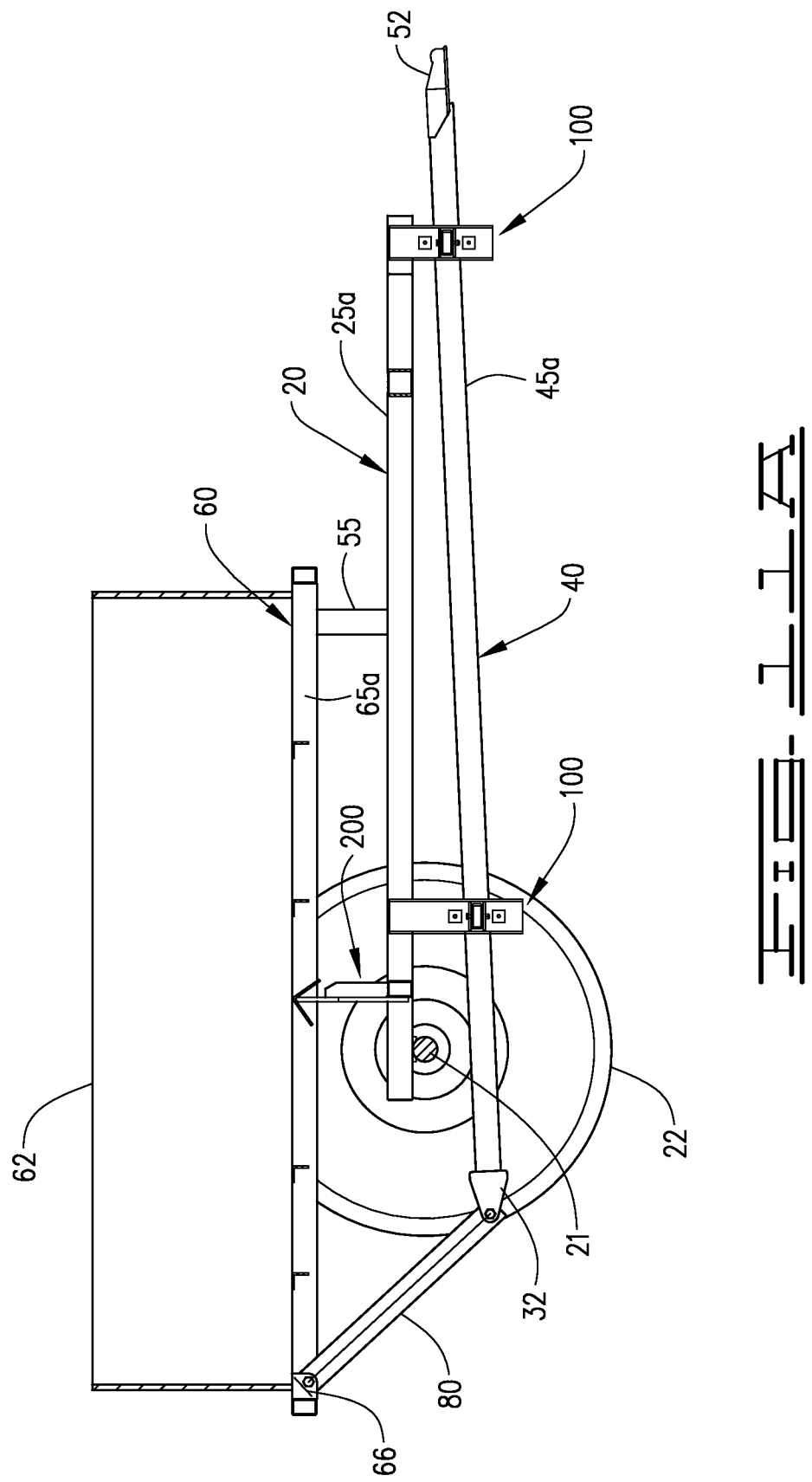

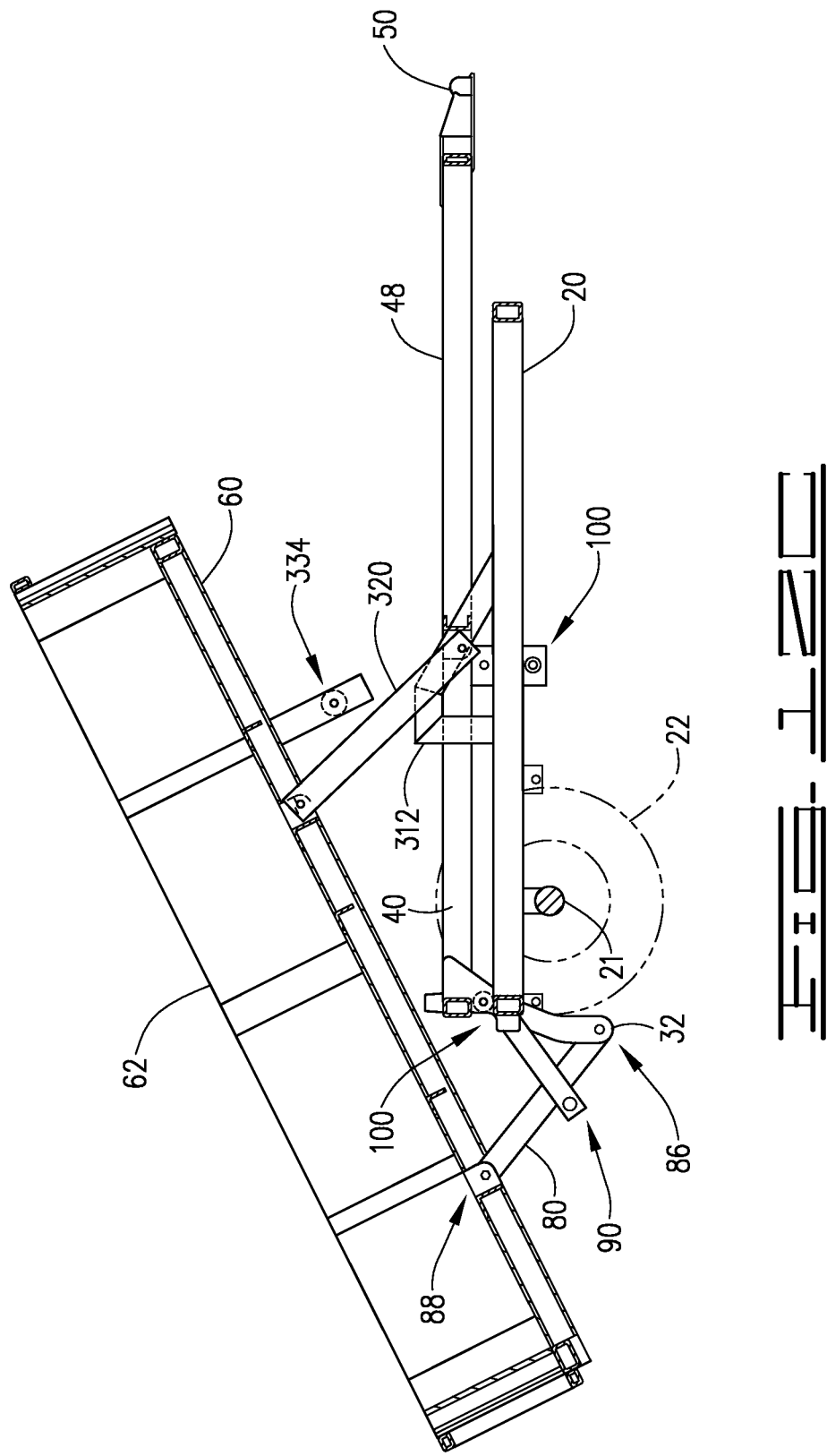

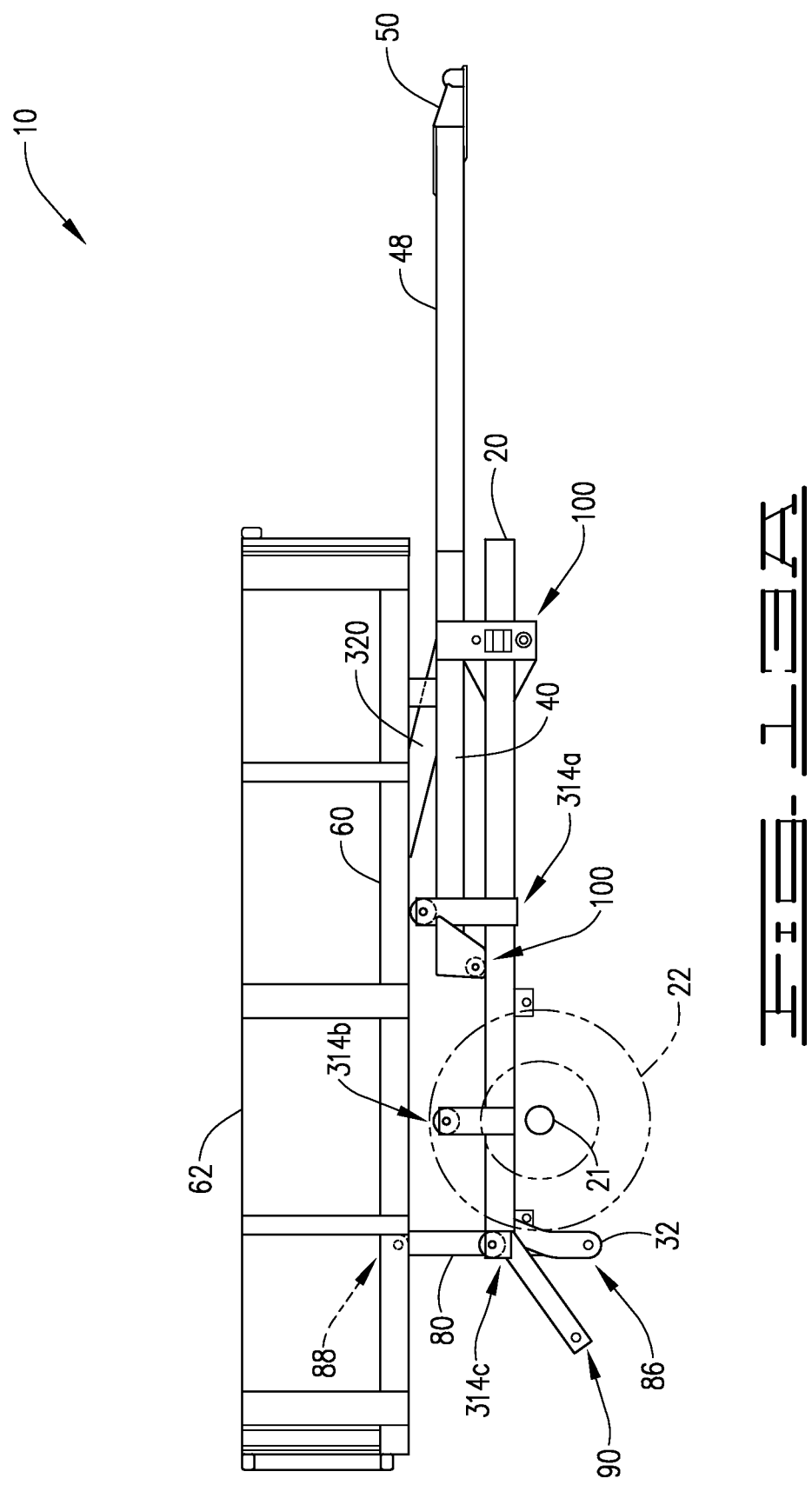

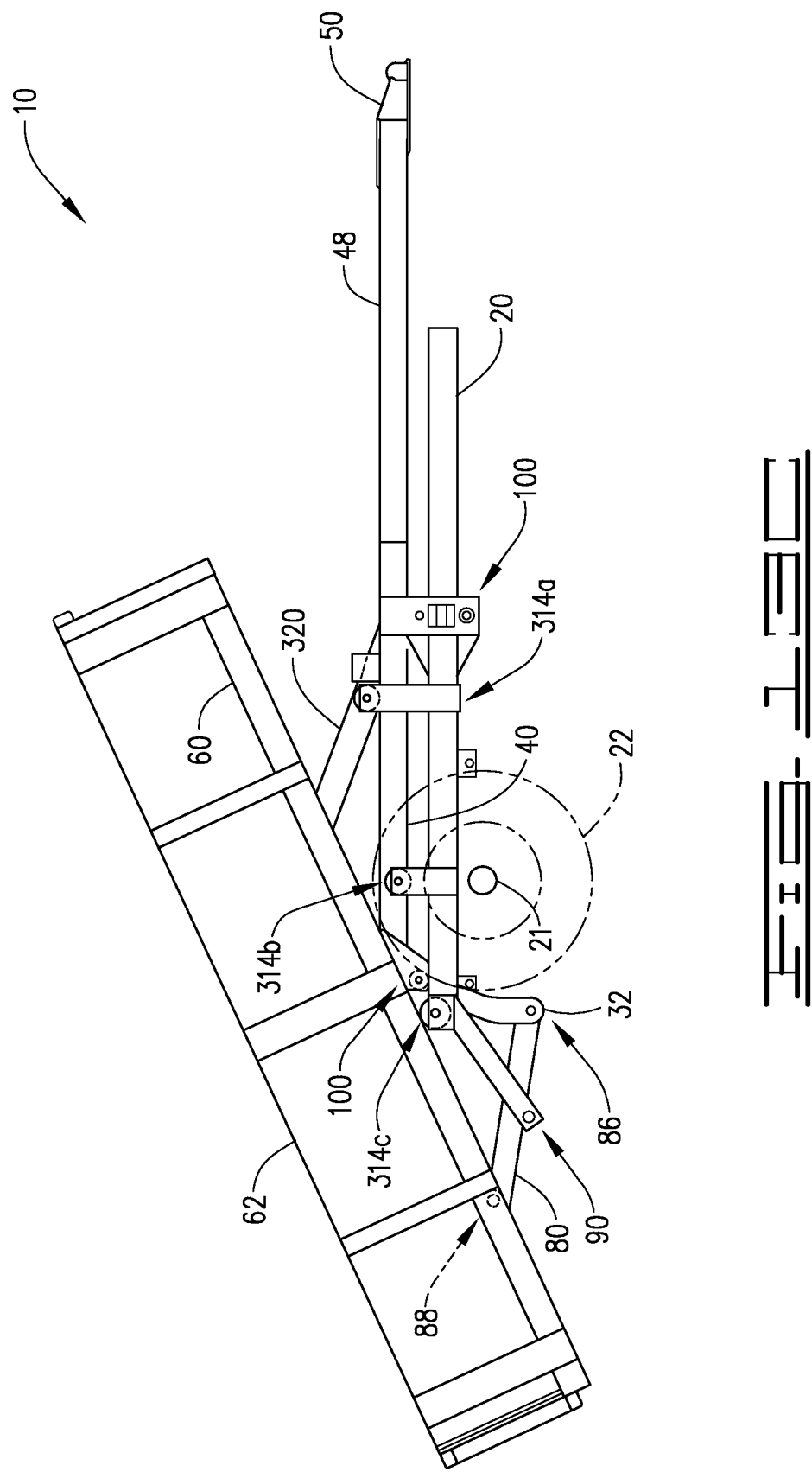

DUMP TRAILER

RELATED APPLICATIONS

The present application is a continuation-in-part of U.S. application Ser. No. 13/126,807 which is a U.S. national phase application of PCT/US2011/026270 filed on Feb. 25, 2011 which claims priority to U.S. provisional application Ser. No. 61/308,743 filed on Feb. 26, 2010.

BACKGROUND

There are a variety of towable dump trailers available on the market. One of the most common designs utilizes hydraulic power to initiate the dump mechanism. Although such designs possess the capacity to handle heavy loads and are easy to operate, the components required to drive a hydraulic power system are quite expensive and are not practical for sporadic individual use or for those that have a tight budget.

Beyond the hydraulic system design, most dump trailers either cannot handle significant loads, cannot be tipped at a controlled rate or require the user to leave the cab of the towing vehicle. As such, what is needed is a dump trailer that has all the advantages of a hydraulic system without the high cost associated with such designs.

SUMMARY

A dump trailer is provided that solves the problems associated with prior designs in that (1) significant loads can be accommodated, (2) the trailer bed can be lowered to the ground slowly and to varying degrees, (3) the dump mechanism can be initiated and completed without the user leaving the towing vehicle cab, (4) it can be constructed for a cost significantly less than that of hydraulic designs and (5) it conserves energy as it does not require a power source to drive the hydraulic system.

The invention described herein is related to a dump trailer that does not require a power system beyond the towing vehicle to perform the dumping mechanism. In one embodiment, the dump trailer comprises a first, second and third frame, each frame comprising one or more support members. In one aspect, the support members are a series of interconnected longitudinal and lateral support beams arranged to form a generally rectangular support frame. The first frame further comprises one or more axles which each provide a set of wheels. The second frame further comprises a towing vehicle attachment site. The third frame provides the support frame for the bed of the trailer and is positioned above the first and second frames.

The dump trailer further comprises a horizontal displacement means positioned between the first and second frames, which permits the second frame to move horizontally forward and backward relative to the first frame.

Additionally, the dump trailer comprises a pivoting means which facilitates the dumping mechanism of the third frame by permitting the third frame to pivot as the second frame moves horizontally forward and rearward relative to the first frame. Alternatively, a vertical elevator means can be employed in lieu of a pivoting means. The vertical elevator means provides a vectorial component of upward force at the front of the trailer that is not present when the dump mechanism employs the pivoting means. The component of upward force provided by the vertical elevator means increases ground clearance at the rear of the trailer bed when the trailer bed is in the fully articulated dump position, and further provides a greater dump angle as compared to use of the pivoting means without adjusting height or length of the trailer.

The dump trailer further comprises one or more rear torque arms or pivoting arms. The one or more rear torque arms are coupled to a rear portion of the third frame and cause the third frame to pivot about the pivoting means as the second frame moves horizontally backward and forward relative to the first frame. In the instance the vertical elevator means is employed, the one or more rear torque arms act in concert with the vertical elevator means to articulate the third frame.

The dump trailer can be arranged in either a reverse-dump configuration or a forward-dump configuration. In the reverse-dump configuration, the dumping mechanism is performed by immobilizing the first frame and subsequently, backing the towing vehicle toward the stationary first frame. The first frame can be immobilized by a number of different mechanisms, but is preferably performed by remotely activating an electric braking mechanism. As the towing vehicle is coupled to the second frame, the backing of the towing vehicle causes the second frame to move horizontally rearward relative to the stationary first frame. Since the third frame is coupled to the second frame via the pivoting means, the horizontal rearward movement of the second frame translates to movement of the third frame. However, the horizontal rearward movement of the third frame is accompanied by pivotal movement about the pivoting means as the rear torque arms drive or pull the rear portion of the third frame toward the ground. Alternatively, when the vertical elevator means is used in lieu of the pivoting means, the force imparted on the rear portion of the third frame by the rear torque arms acts in concert with the force imparted on the front portion of third frame by the vertical elevator means until the rear torque arms reach a physical stopping point. At such time and as the second frame continues to move rearward with respect to the first frame, the vertical elevator means continues to apply force to the front portion of the trailer bed to continue articulation of the trailer bed about a pivot point defined by the connection point of the rear torque arm to the third frame. Therefore, the vertical elevator means permits greater ground clearance for the rear portion of the third frame in the fully articulated dump position, and also provides for a greater final dump angle of the third frame. Finally, the third frame is positioned back to its initial resting position by the towing vehicle pulling the second frame forward to its original towing position.

In the reverse-dump configuration, the second frame is positioned between the first and third frame and the rear torque arms are coupled to the first frame and extend to the third frame. Additionally, the pivoting means includes components coupled to both the second and third frames while the one or more vertical elevator means include components coupled to the first, second, and third frames.

In the forward-dump configuration, the dumping mechanism is performed by immobilizing the first frame and subsequently, driving the towing vehicle forward away from the stationary first frame. In this configuration, the first frame is alternatively positioned between the second frame and third frame and the rear torque arms interconnect the second and third frames. Furthermore, the pivoting means includes components attached to both the first frame and third frames. Thus, in this configuration, the third frame is horizontally stationary and simply pivots relative to the pivoting means as the second frame moves horizontally relative to the immobilized first frame.

The first frame can be immobilized by any number of mechanisms, but is preferably performed by activating an electric braking mechanism from the cab of the towing vehicle, thus causing the wheels of the first frame to become stationary. The horizontal displacement means, vertical elevator means, pivoting means and rear torque arms can take a variety of different forms beyond those described herein as long as each performs its intended function. Furthermore, the dump trailer can be arranged in a variety of configurations without departing from the inventive concept described in the following exemplary and preferred embodiments.

BRIEF DESCRIPTION OF THE DRAWINGS

FIG. 1C is a perspective view of a dump trailer in a forward-dump configuration comprising a pivoting means.

FIG. 1D is a perspective view of the dump trailer in a reverse-dump configuration with a vertical elevator means.

FIG. 1E is a perspective view of the dump trailer in a reverse-dump configuration with an alternative embodiment of the vertical elevator means.

FIG. 2A is a side view of the embodiment of FIG. 1A in a tow position.

FIG. 3A is a perspective view of the first frame of the embodiment of FIG. 1A.

FIG. 3D is a perspective view of the first frame of the embodiment of FIG. 1E.

FIG. 4A is a perspective view of the second frame of the embodiment of FIG. 1A.

FIG. 4B is a perspective view of the second frame of the embodiment of FIG. 1C.

FIG. 4C is a perspective view of the second frame of the embodiment of FIGS. 1D and 1E.

FIG. 5A is a perspective view of the third frame of the embodiment of FIG. 1A.

FIG. 5B is a perspective view of the third frame of the embodiment of FIG. 1B.

FIG. 5D is a perspective view of the third frame of the embodiment of FIG. 1E.

FIG. 6A is a front, cross-sectional view of one embodiment of a horizontal displacement means.

FIG. 6B is a perspective view of a second embodiment of a horizontal displacement means.

FIG. 6C is a front cross-sectional view of the horizontal displacement means embodiment of FIG. 6B.

FIG. 8A is a side cross-sectional view of a second embodiment of a pivoting means.

FIG. 10A is a side cross-sectional view of the embodiment of FIG. 1B in a tow position.

FIG. 10B is a side cross-sectional view of the embodiment of FIG. 1B in a dump position.

FIG. 11A is a side cross-sectional view of the embodiment of FIG. 1C in a tow position.

FIG. 12C is a side cross-sectional view of the embodiment of FIG. 1D in a dump position.

FIG. 13A is a side cross-sectional view of the embodiment of FIG. 1E in a tow position.

FIG. 13C is a side cross-sectional view of the embodiment of FIG. 1E in a final dump position.

FIG. 16A is a rear perspective view of the trailer providing a magnification of one embodiment of a stop member for the rear torque arms.

FIG. 16B is a rear perspective view of the trailer providing a magnification of another embodiment of a stop member for the rear torque arms.

DETAILED DESCRIPTION

The current invention is directed to a dump trailer that does not require a hydraulic or other power system. The inventive dump trailer design provides an efficient and controlled dumping action that can handle payloads comparable to hydraulic dump trailers without the expense and maintenance issues associated with such trailers. The dump trailer generally comprises three frames that are horizontally, vertically, and/or pivotally movable with respect to each other. The dump trailer operates by immobilizing one of the trailer frames and either backing the tow vehicle toward the immobilized trailer frame or moving the tow vehicle forward away from the immobilized frame. The forward or rearward displacement of one or more of the frames with respect to the immobilized frame initiates a dumping mechanism thereby causing a trailer bed frame to tilt.

Although a variety of non-hydraulic dump trailers have been described previously, the current dump trailer provides a significant departure from these previous designs and yields a dump trailer with a superior load capacity and improved dumping control. The advantages and improvements of the inventive dump trailer will become more apparent as the embodiments are described in more detail below.

Figure 1A:
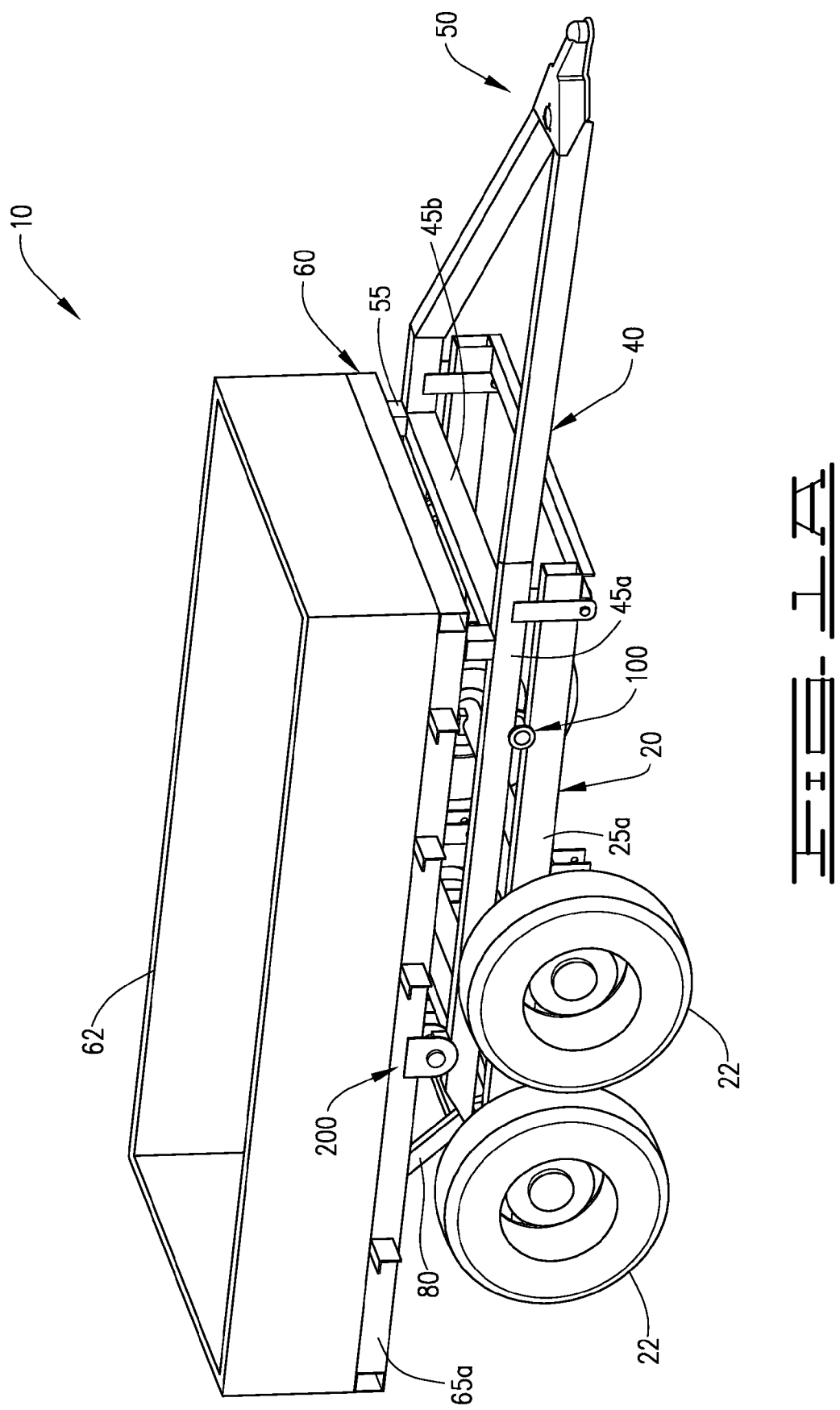
FIG. 1A is a perspective view of the dump trailer in a reverse-dump configuration comprising a pivoting means.

FIGS. 1A-F provide various alternative embodiments of the inventive dump trailer 10. FIGS. 1A, 1B, 1E, and 1F are directed to embodiments wherein the tow vehicle reverses toward the stationary first frame of the dump trailer to perform the dumping action (referred to herein as the "reverse-dump configuration"). Alternatively, FIG. 1C is directed to an embodiment wherein the tow vehicle pulls forward away from the stationary first frame to perform the dumping action (referred to herein as the "forward-dump configuration"). In the forward-dump configuration, third frame 60 remains in a fixed horizontal position as it tilts or dumps whereas in the reverse-dump configuration, third frame 60 moves horizontally rearward with the second frame 40 during the dumping action. Furthermore, the dumping action in either configuration can be performed by a "pivot-dump mechanism" or an "elevator-dump mechanism," the various structural embodiments of which are discussed in more detail herein below.

Regardless of the particular embodiment, dump trailer 10 generally comprises a first frame 20, a second frame 40 and a third frame 60. First frame 20, second frame 40 and third frame 60 are each comprised of one or more support members 25, 45, 65 respectively. The one or more support members 25, 45, 65 can consist of one or more longitudinal support beams 25a, 45a, 65a and one or more lateral support beams 25b, 45b, 65b. First frame 20 further comprises one or more axles 21 supporting one or more sets of wheels 22. Second frame 40 generally comprises a towing vehicle attachment site 50 and one or more resting posts 55. Third frame 60 generally forms the support structure for the base of the trailer bed 62.

The three frames of dump trailer 10 are functionally and structurally connected by the rear torque arms 80, pivoting means 200 or vertical elevator means 300, and horizontal displacement means 100. Rear torque arms 80 extend between the rear portion of first frame 20 and third frame 60 and cause the third frame 60 to pivot or tilt as second frame 40 moves horizontally rearward relative to first frame 20. Horizontal displacement means 100 is positioned between one or more support members 25, 45 of first frame 20 and second frame 40, respectively, and permits the second frame 40 to move horizontally forward and backward relative to first frame 20. Pivoting means 200 permits the pivoting or tilting action of third frame 60 caused by rear torque arms 80 as second frame 40 moves horizontally forward and rearward relative to the first frame 20. Thus, when pivoting means 200 is employed, rear torque arms 80 are responsible for causing the pivotal movement of third frame 60 as second frame 40 progresses rearward horizontally. Alternatively, vertical elevator means 300 provides a vectorial component of upward force at the front of third frame 60 in addition to the downward force applied by rear torque arms 80 at the rear portion of third frame 60. Vertical elevator means 300 acts in concert with rear torque arms 80 to drive articulation of the third frame 60 until rear torque arms 80 reach a stop member 90. At such time, vertical elevator means 300 continues to articulate third frame 60 about a pivot point defined by the connection between rear torque arms 80 and third frame 60 until the final dump articulation is reached. As such, vertical elevator means 300 provides third frame 60 with greater ground clearance at the rear of third frame 60 in the fully articulated position without a loss in final dump angle as compared to trailers employing use of pivoting means 200. In addition, vertical elevator means provides for an increased final dump angle as compared to a trailer using pivoting means 200 without increasing the distances of frames from the ground. Pivoting means 200 and vertical elevator means 300 each include several structural embodiments which are described in further detail below.

In the reverse-dump configuration depicted in FIGS. 2A-B, 10A-B, 12A-B, and 13A-B, the dumping mechanism can be performed by immobilizing the first frame 20 and, subsequently, backing the towing vehicle (not depicted) toward the stationary first frame 20. This action causes the second frame 40, which is coupled to the towing vehicle, to move horizontally rearward relative to the stationary first frame 20. As depicted in FIGS. 2A-B and 10A-B, this horizontal rearward movement of second frame 40 is also translated to the third frame 60 by the pivoting means 200 (which interconnects the second frame 40 with third frame 60). However, instead of moving directly rearward with second frame 40, third frame 60 is caused to tilt or pivot about pivoting means 200 due to the rear torque arms 80 pivoting counterclockwise about their connection to first frame 20 thereby driving or pulling the rear portion of third frame 60 toward the ground (the "pivot-dump mechanism").

Alternatively, FIGS. 12A-B and 13A-B depict embodiments of the elevator-dump mechanism. In this mechanism, vertical elevator means 300 provides a vectorial component of upward force at the front of third frame 60 in addition to the downward force applied by rear torque arms 80. Vertical elevator means 300 acts in concert with rear torque arms 80 to drive articulation of the third frame 60 until rear torque arms 80 are prevented from pivoting further by stopping means 90. At such time, vertical elevator means 300 continues to articulate third frame 60 about a pivot point defined by the connection between rear torque arms 80 and third frame 60 until the final dump articulation is reached. In these embodiments, second frame 40 is positioned between first frame 20 and third frame 60, and rear torque arms 80 are coupled to a rear lateral support beam 25b of the stationary first frame 20 and extend to a rear lateral support 65b of third frame 60.

In the forward-dump configuration depicted in FIGS. 11A-B, the dumping action is performed by immobilizing first frame 20 and subsequently, driving the towing vehicle forward away from stationary first frame 20. In this embodiment, the first frame 20 is alternatively positioned between the second frame 40 and third frame 60, and the rear torque arms 80 interconnect second frame 40 and third frame 60. Furthermore, the pivoting means 200 includes components attached to first frame 20 and third frame 60. Thus, in this embodiment, third frame 60 is horizontally stationary and pivots or tilts as second frame 20 moves horizontally relative to the immobilized first frame 20.

One embodiment of first frame 20 suitable for a reverse-dump configuration with a pivot-dump mechanism is depicted in FIG. 3A. Here, first frame 20 comprises a pair of parallel longitudinal support beams 25a and a plurality of lateral support beams 25b that traverse the longitudinal support beams 25a. The front or forward lateral support 25b is attached to the underside of the longitudinal support beams 25a and includes flange 27 which extends toward the ground. Flange 27 provides a surface to limit forward motion of the second frame 40 relative to the first frame 20. First frame 20 further comprises one or more lower mounting brackets 32 attached to a rear lateral support beam 25b for providing an attachment site for rear torque arms 80. The details of lower mounting bracket 32 are described in more detail below.

Continuing with FIG. 3A, first frame 20 further comprises one or more axles 21 each supplying a pair of wheels 22 suitable for permitting transport of trailer 10 and also providing a means to immobilize first frame 20 to perform the dumping action. Axles 21 can be positioned at any point along the length of longitudinal support beams 25a. However, in a preferred embodiment, axles 21 and wheels 22 are positioned in the rear half of first frame 20.

Figure 3B:
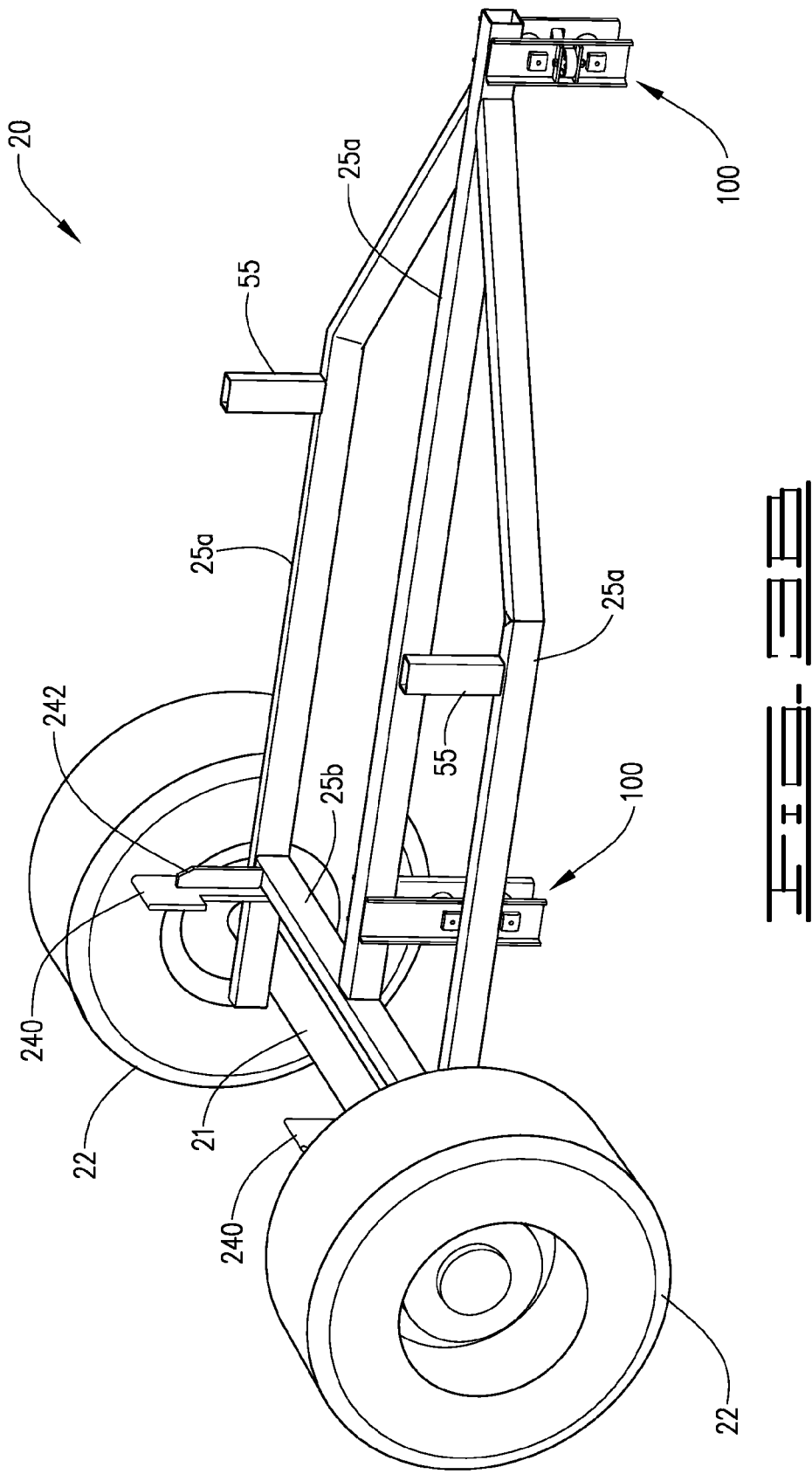
FIG. 3B is a perspective view of the first frame of the embodiment of FIG. 1C.

FIG. 3B depicts an embodiment of first frame 20 suitable for a forward-dump configuration. The modifications to first frame 20 in this embodiment are a result of the preferred arrangement of the frames for a forward-dump configuration. Thus, portions of pivoting means 200, in this instance rocker plate 240 and support plate 242, are associated with first frame 20 (rather than second frame 40 as in the reverse-dump configuration). Similarly, first frame 20 comprises resting posts 55 for supporting third frame 60 in the tow position. In addition, first frame 20 provides an attachment site for the vertical displacement means 100 (described in detail below).

Figure 3C:
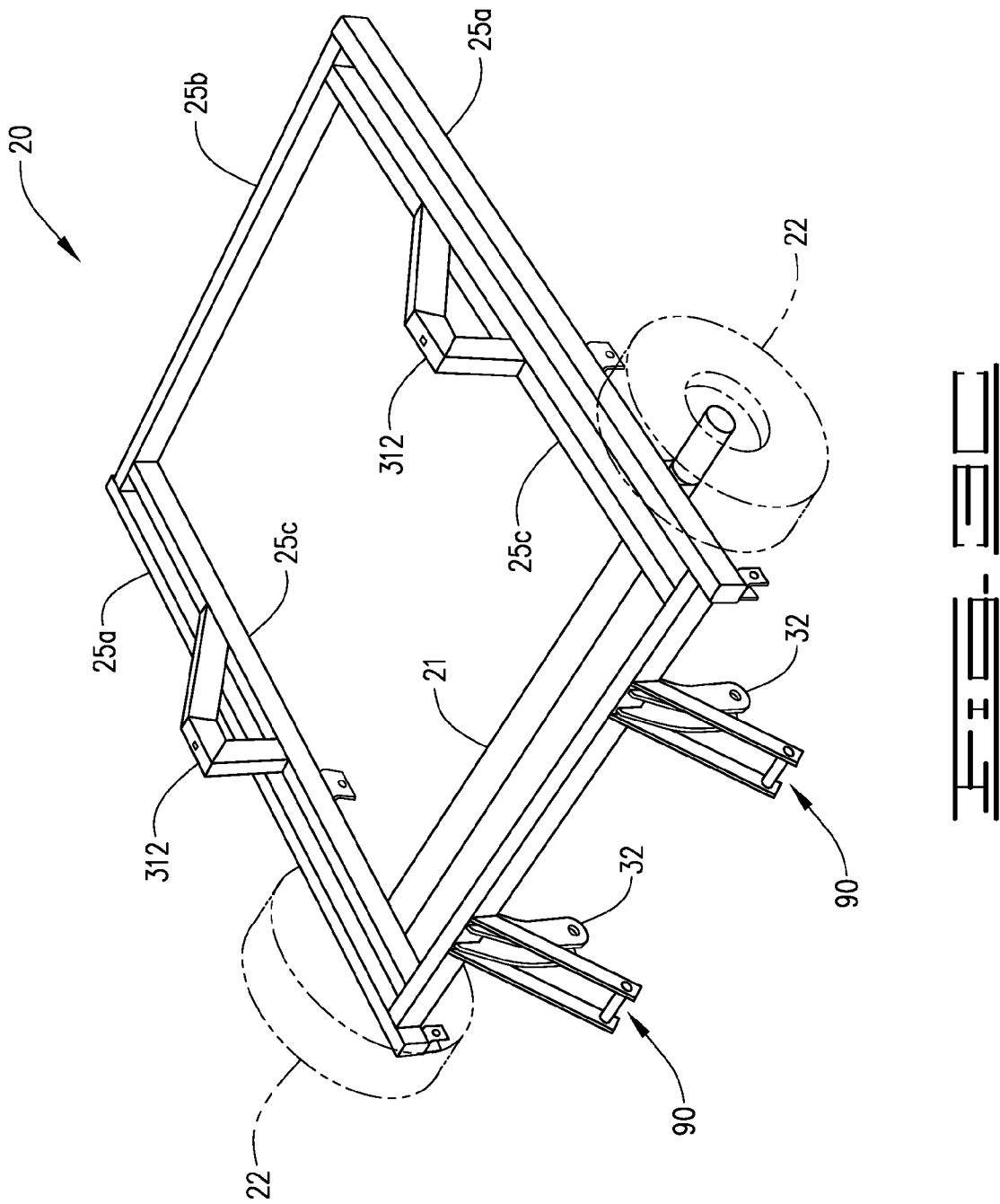
FIG. 3C is a perspective view of the first frame of the embodiment of FIG. 1D.

Two embodiments of first frame 20 suitable for a reverse-dump configuration with the elevator dump-mechanism are depicted in FIGS. 3C-D. Referring now to FIG. 3C, first frame 20 comprises a ramped track 312 extending upward from each of two inner longitudinal support beams 25c. Alternatively in FIG. 3D, first frame 20 comprises a front stationary roller arm 314a, an intermediate stationary roller arm 314b, and a rear stationary roller arm 314c extending upward at progressively decreasing heights, respectively, from each of the two longitudinal support beams 25a. In these embodiments, the front lateral support beam 25b provides a surface to limit forward motion of second frame 40 relative to first frame 20. Additionally, first frame 20 comprises a pair lower mounting brackets 32 attached to the rear lateral support beam 25b to provide an attachment site for rear torque arms 80.

In each embodiment, dump trailer 10 comprises a braking mechanism (not shown) independent of the towing vehicle brake system. The brake system permits immobilization of first frame 20 by locking wheels 22 thereby allowing the tow vehicle to move second frame 40 rearward and forward relative to the stationary first frame 20. Preferably, the braking mechanism can be performed without leaving the cab of the towing vehicle. In one embodiment, the braking mechanism comprises a receiver electrically coupled to one or more of the brakes. The receiver has the capacity to receive signals via a remote located in the cab of the towing vehicle. In response to a remote signal, the receiver sends an electrical current sufficient to engage the brakes. A suitable receiver has a 12 V DC input and output with a 6 Amp maximum output current with sufficient wiring to draw on a power supply and to apply an electrical current to engage the brakes. The remote is preferably battery powered and provides controls for engaging and releasing the brakes. The brakes can comprise any trailer brake having the capacity to receive an electrical signal and must have sufficient breaking capacity to prevent movement of first frame 20 during the dumping process. However, an electric braking mechanism is not absolutely necessary. In another embodiment, wheels 22 can be simply blocked on either side by structure suitable to prevent movement of the first frame 20 as the towing vehicle displaces second frame 40.

FIGS. 4A and 4C depict embodiments of second frame 40 for use with a pivot-dump mechanism and an elevator-dump mechanism, respectively, in combination with the reverse-dumping configuration. In both embodiments, second frame 40 is disposed between the first frame 20 and third frame 60 and provides the portion of trailer 10 that is coupled to the towing vehicle to actuate the dumping action. Referring now to FIG. 4A, second frame 40 comprises two longitudinally extending support beams 45a as well as two lateral support beams 45b. Additionally, second frame 40 includes towing vehicle coupling portions 48 such as angled tongues 49 extending from each end of the longitudinal support beams 45a. Alternatively, the towing vehicle coupling portion 48 can comprise a single tongue portion which extends from a front end lateral support 45. In either case, tongues 49 should be of a length to provide sufficient displacement of second frame 40 without contacting first frame 20 as the towing vehicle backs up.

Second frame 40 also comprises a towing vehicle attachment site 50. Attachment site 50 can include any suitable attachment means 52 that permits attachment of the trailer 10 to the towing vehicle. For example, attachment means 52 is a standard trailer hitch. Second frame 40 further comprises one or more third frame resting posts 55. Resting posts 55 can be placed anywhere on the front portion of second frame 40 and preferably extend from the longitudinal support beams 45a. Resting posts 55 should be of a height sufficient to allow the third frame 60 to rest at an orientation parallel to the first frame 20 and second frame 40 when in tow position.

Still referring to FIG. 4A, second frame 40 can include components of pivoting means 200. In one embodiment, vertical posts 222 are attached to each longitudinal support beam 45a and support an outer pipe 220 which is associated with counterparts 210 and 212 of third frame 60 (see FIG. 5A). In another embodiment, rocker plate 240 and support plates 242, 244 can be coupled to second frame 40 (see FIGS. 8A and 8C).

Referring now to FIG. 4C, second frame 40 adapted for an elevator-dump mechanism is shown. In this instance, second frame 40 includes attachment site 43 for one elevator arm 320. Elevator arm 320 is pivotally connected to lateral support beam 45a via attachment site 43 and extends to attachment site 63 of third frame 60 (see FIG. 5C).

FIG. 4B depicts an embodiment of second frame 40 for use in the forward-dumping configuration. In this embodiment, second frame 40 comprises a single longitudinal support beam 45a with attachment means 52 and lower mounting bracket 32. Thus, rear torque arm 80 is attached to second frame 40 in this embodiment of a forward-dumping configuration.

FIGS. 5A-D depict several embodiments of third frame 60. Third frame 60 provides the base for trailer bed 62. Third frame 60 generally comprises two or more longitudinal support beams 65a which are traversed by a series of lateral support beams 65b. Additionally, third frame 60 comprises one or more upper mounting brackets 66 for attachment of the rear torque arms 80.

FIGS. 5A-B depict embodiments of third frame 60 for use with a pivot-dump mechanism. Here, third frame 60 provides attachment sites for components of pivoting means 200. As depicted in FIG. 5A, longitudinal support beams 65a have attached thereto flanges 212 which supply inner pipe 210 in one embodiment of pivoting means 200 described below. Another embodiment of pivoting means 200 comprises angle iron 230 which is disposed between longitudinal support beams 65a of third frame 60 as shown in FIG. 5B. The structural components of each of these pivoting means 200 will be discussed in further detail below.

Figure 5C:
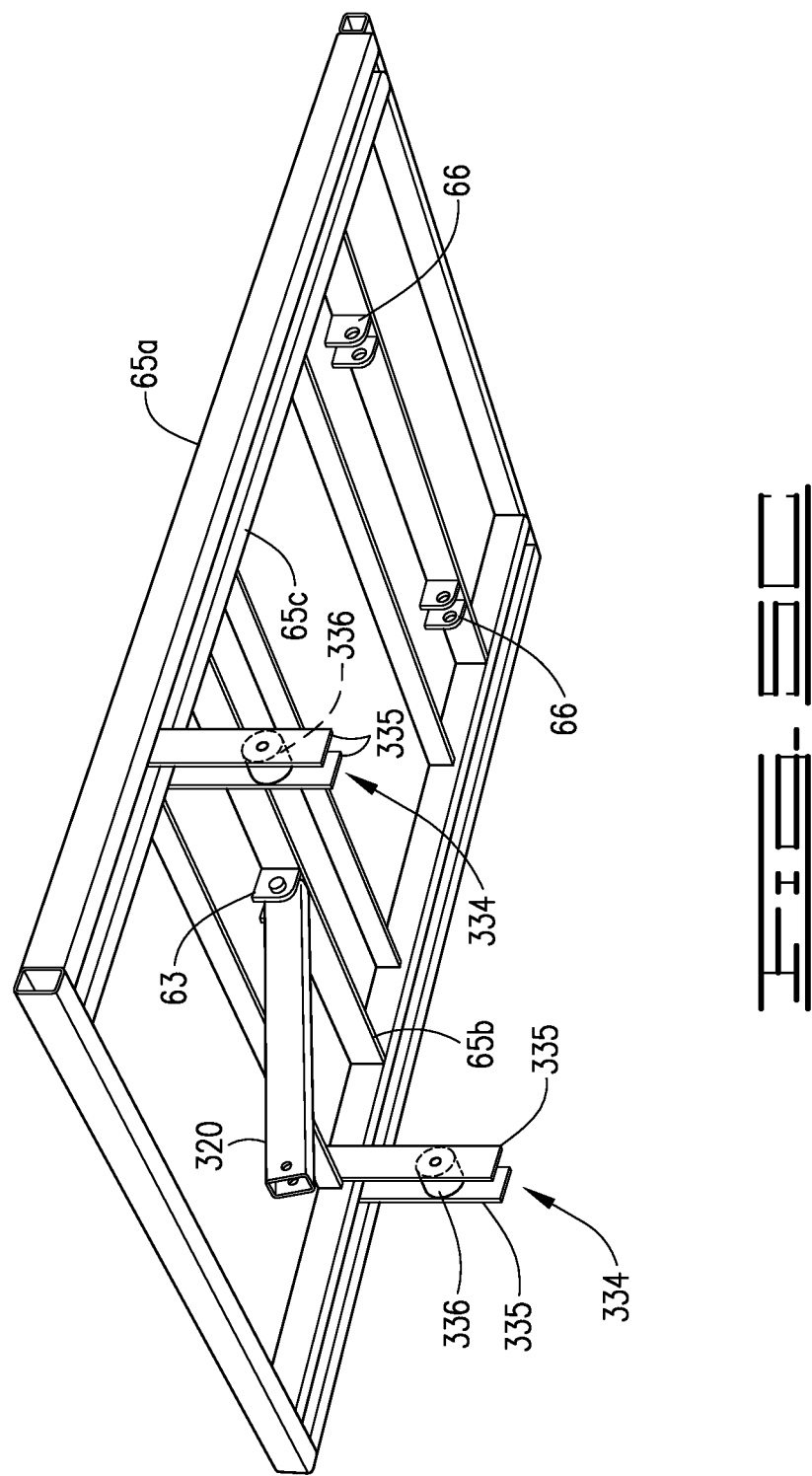
FIG. 5C is a perspective view of the third frame of the embodiment of FIG. 1D.

FIGS. 5C-D depict embodiments of third frame 60 for use with an elevator-dump mechanism. In these embodiments, support member 65b provides attachment site 63 for pivotally attaching elevator arm 320 to third frame 60. In the embodiment depicted in FIG. 5C, roller arms 334 provide rollers 336 and are attached to the inside longitudinal support beams 65c which are alignment with ramped tracks 312 of first frame 20 (see FIG. 3C). FIG. 5D shows an embodiment of third frame 60 to be used in combination with first frame 20 employing stationary rollers 314a, 314b, 314c.

Figure 1B:
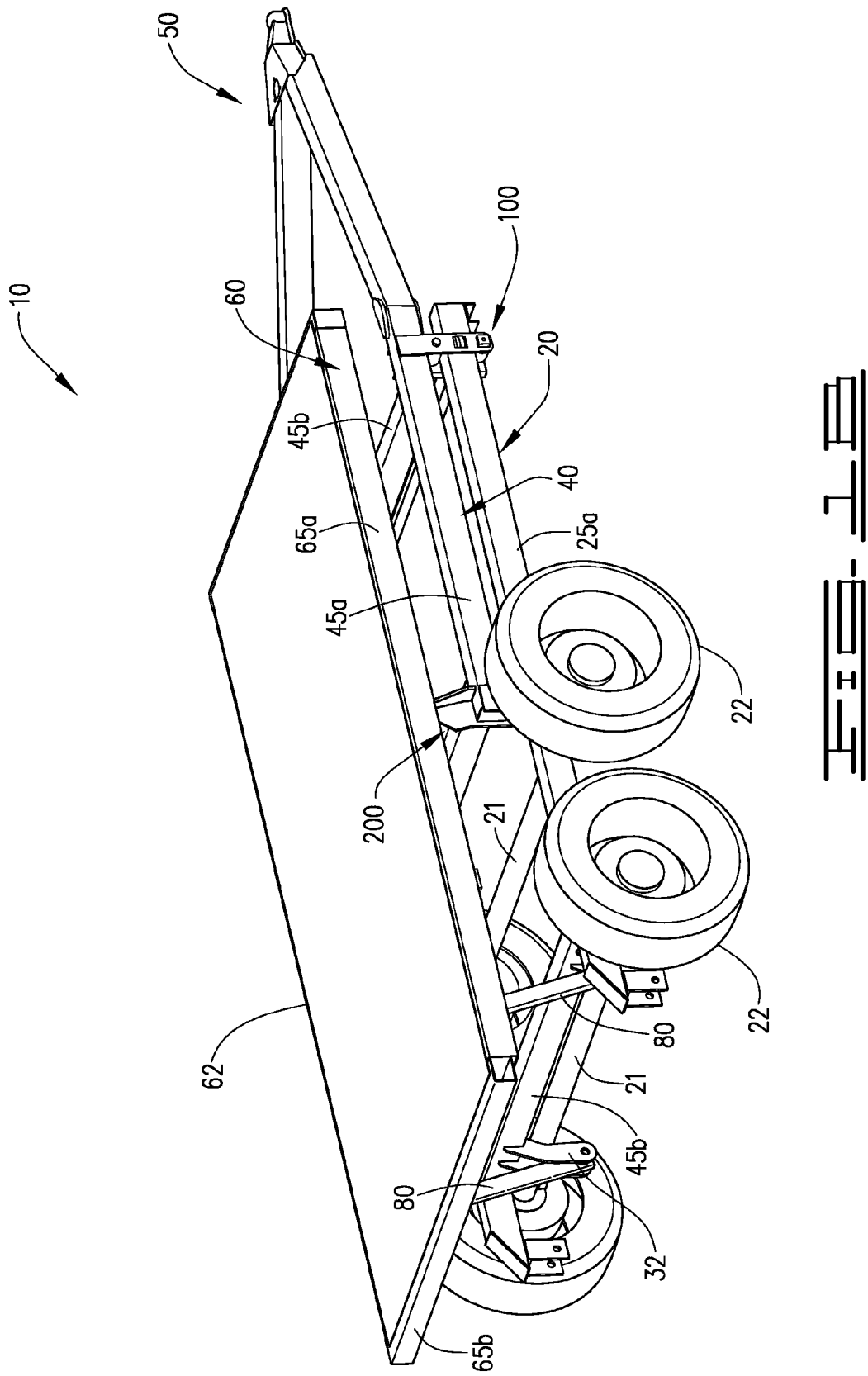
FIG. 1B is a perspective view of another embodiment of the dump trailer in a reverse-dump configuration comprising a pivoting means.
Figure 2B:
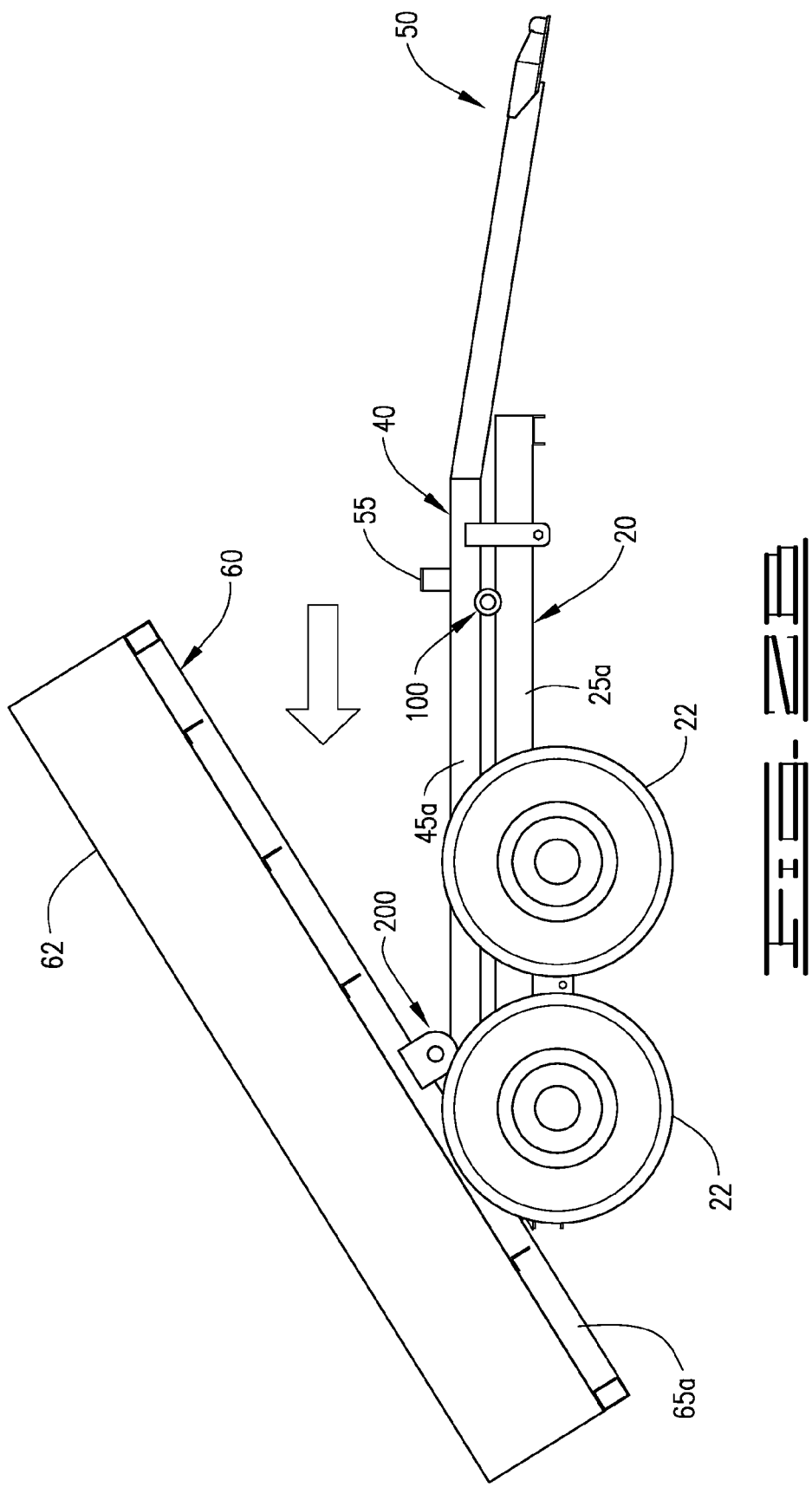
FIG. 2B is a side view of the embodiment of FIG. 1A in a dump position.

Third frame 60 can support a variety of trailer beds 62. In one embodiment, trailer bed 62 can comprise front, rear and side walls as depicted in FIG. 1A. Alternatively, trailer bed 62 can be constructed as a flat bed as shown in FIG. 1B.

Dump trailer 10 further comprises horizontal displacement means 100 to permit forward and rearward horizontal movement of the second frame 40 relative to the first frame 20. Horizontal displacement means 100 can preferably be disposed between longitudinal beams 25a, 45a. As depicted in FIG. 6A, one embodiment of horizontal displacement means 100 comprises a cylindrical roller 110 that extends at least the width of longitudinal support beams 25a, 45a. The cylindrical roller 110 is attached on each end by two outer flanges 112. Outer flanges 112 are of a sufficient length to overlap the adjacent longitudinal support beams 25a and 45a of the first frame 20 and second frame 40, respectively, and secure the rollers 110 between the longitudinal support beams 25a, 45a.

In an alternative embodiment depicted in FIGS. 6B and 6C, horizontal displacement means 100 includes a top roller 114, a bottom roller 116 and side rollers 118. The top and bottom rollers 114, 116 are secured between plates 122 via a pin 124. Side rollers 118 are secured by pin 129 in an opening 126 in plates 122 located between the top and bottom roller attachment sites. A flange 128 is located on the top and bottom side of opening 126 which permits attachment of side rollers 118 to plate 122. FIGS. 1C and 6C depict this horizontal displacement means 100 in a forward dump configuration wherein, the series of rollers 114, 116, 118 surround a longitudinal support beam 45a of second frame 40 and plates 122 are fixed to a longitudinal support beam 25a of first frame 20. Alternatively, in a reverse-dump configuration as depicted in FIGS. 10A and 10B, rollers 114, 116, 118 contact longitudinal support beam 25a of first frame 20 and plates 122 are fixed to a longitudinal support beam 45a of second frame 40.

In either embodiment of horizontal displacement means 100 discussed above, the various rollers 110, 114, 116, 118 should be of a hardness that reduces tangential friction as second frame 40 moves forward and rearward horizontally along first frame 20. Finally, the material of the roller 110 must be strong enough to resist damage from foreign debris that may land upon the top side of beams 24. In one aspect, rollers 110, 114, 116, 118 are a solid 2" steel cylinder. The number of horizontal displacement means 100 employed can vary depending on the particular design of the trailer.

In yet another embodiment, horizontal displacement means 100 comprises a thick piece of nylon or other rigid polymer disposed between beam 45a of second frame 40 and beam 25a of first frame 20 to permit a horizontal movement between the frames. The thick plate of polymer provides a low friction interface between first and second frames. Although this option may be suitable in most trailer designs, the use of roller-type structures offers an interface between the first frame 20 and second frame 40 that is even lower in friction by utilizing rolling friction as opposed to sliding friction. The reduction of frictional forces associated with the translation of second frame 40 relative to first frame 20 reduces the overall magnitude of the forces required to articulate third frame 60 into its dumping position.

Figure 7B:
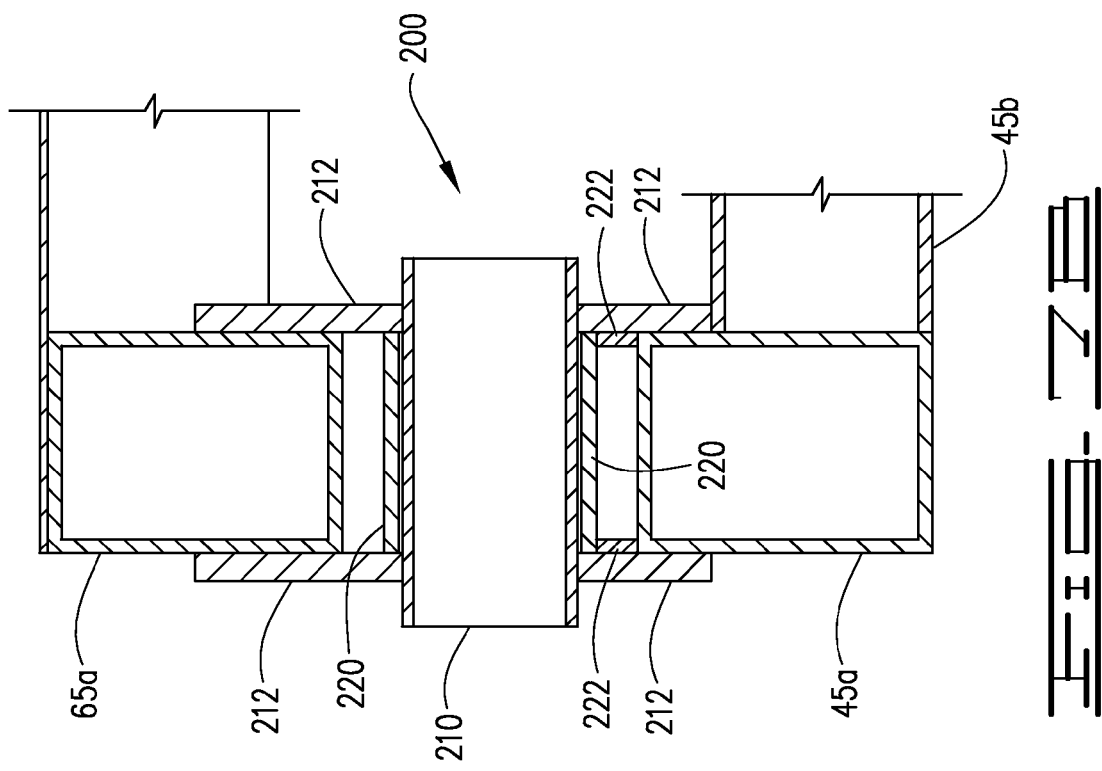
FIG. 7B is a front cross-sectional view of the pivoting means depicted in FIG. 7A.
Figure 7A:
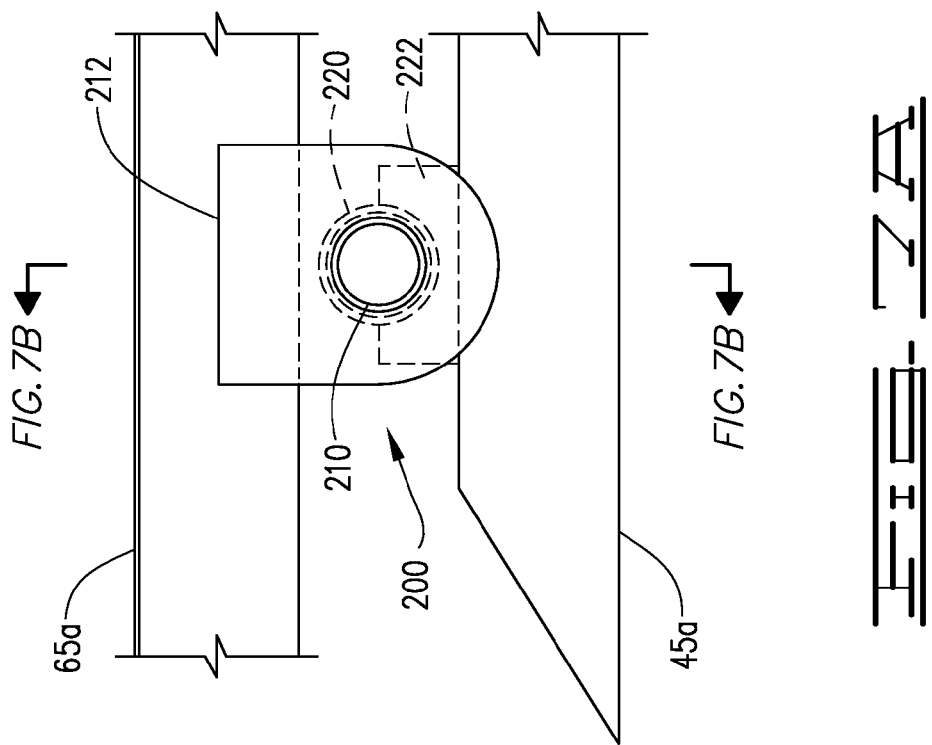
FIG. 7A is a side view of one embodiment of a pivoting means.

For a dump trailer 10 using a pivot-dump mechanism, a pivoting means 200 is utilized which permits pivotal movement of third frame 60 in response to the horizontal displacement of second frame 40. In one embodiment as shown in FIGS. 7A and B, pivoting means 200 comprises an inner pipe 210 attached on either side by flanges 212 which extend down from longitudinal support beam 65a of third frame 60 and an outer pipe 220 attached to vertical post 222 extending from the longitudinal support beam 45a. Inner pipe 210 is of an outer diameter sufficient to fit within the inner diameter of outer pipe 220. In this embodiment, inner pipe 210 is able to rotate within outer pipe 220 thereby permitting pivotal movement of third frame 60 about pivoting means 200. In a related embodiment, inner pipe 210 is not permanently attached to the flanges 212 of the third frame 60 such that it could be replaced if damage was to occur. In this embodiment, the inner pipe 210 comprises an opening for a pin or other device to secure its lateral positioning.

Figure 8C:
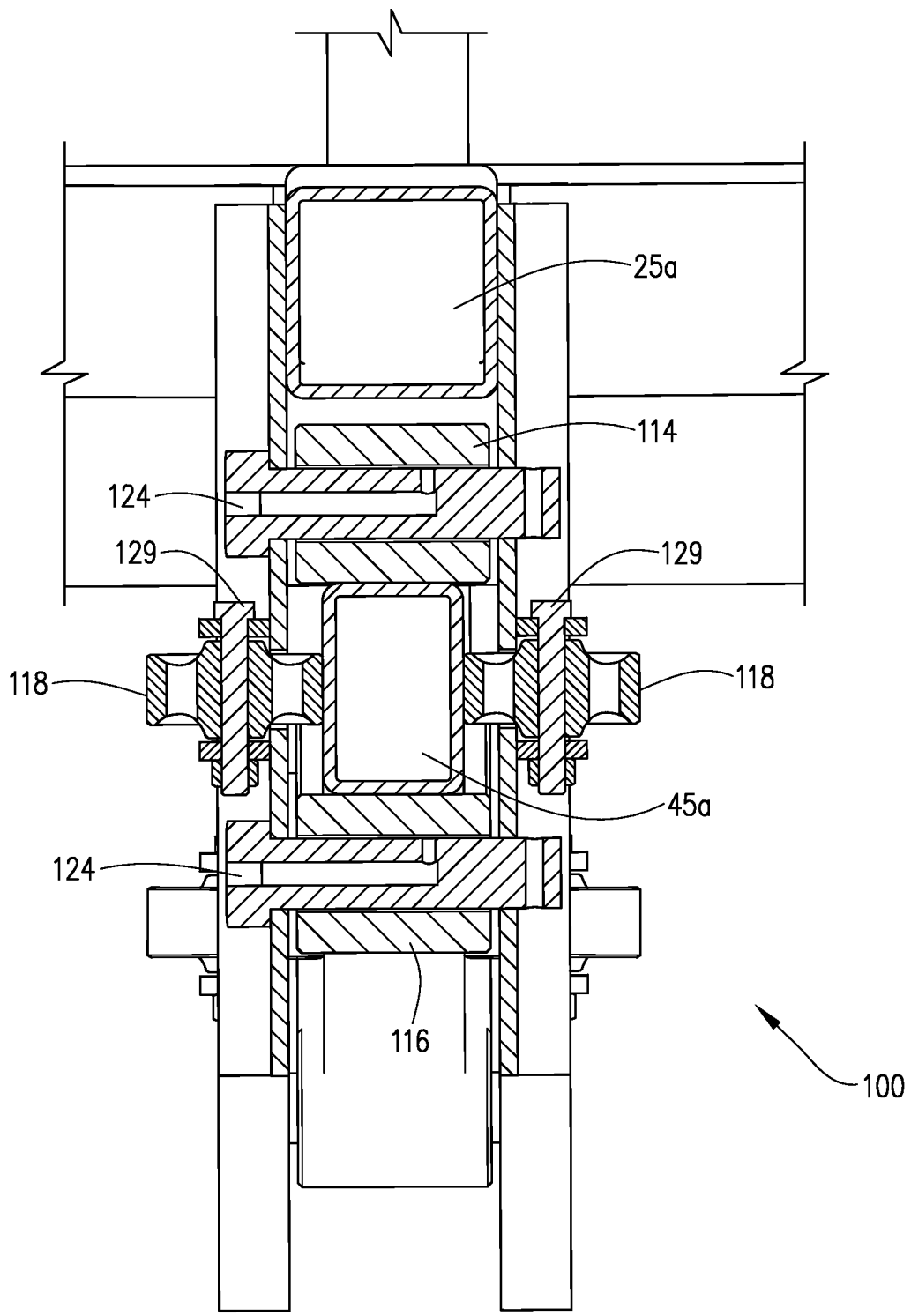
FIG. 8C is an exploded perspective view of an additional horizontal displacement means used in connection with the pivoting means depicted in FIG. 8A.
Figure 8B:
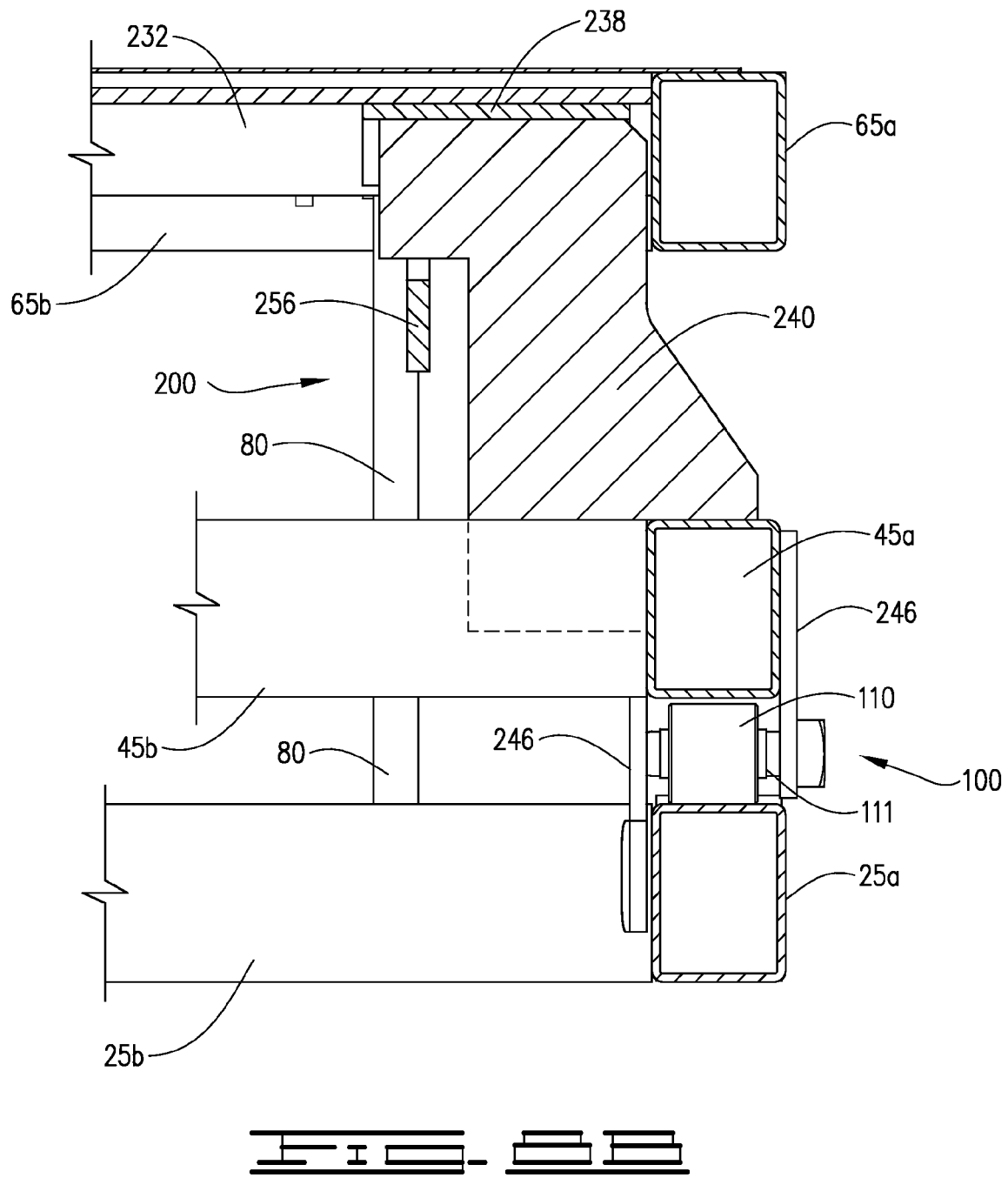
FIG. 8B is a front cross-sectional view of the pivoting means depicted in FIG. 8A.

Another embodiment of pivoting means 200 is depicted in FIGS. 8A and 8B. In this embodiment, pivoting means 200 comprises an angle iron 230 disposed between longitudinal support beams 65a of third frame 60 and a vertical rocker plate 240 extending from a lower frame member (either support member 45 second frame 40 or support member 25 of first frame 20 depending on whether a reverse-dump or forward-dump configuration is employed, respectively). In one embodiment, rocker plate 240 is welded to the back surface of lateral support beam 45b and additionally includes an extended portion attached to longitudinal support beam 45a. Alternatively, rocker plate 240 can be attached to the front or forward surface of lateral support beam 45b. In addition, pivoting means 200 can further comprise perpendicular support plates 242, 244. Support plate 244 is attached to the rear surface of rocker plate 240 and is coupled to longitudinal support beam 45a and lateral support beam 45b. Support plate 242 is coupled to the forward surface of rocker plate 240 and extends from lateral support beam 45b. Alternatively, support plate 242 can be angled such that it contacts both lateral and longitudinal support beams 45b and 45a, respectively. However, any number or arrangement of support plates can be utilized.

Angle iron 230 includes two planar surfaces 232, 234 which are joined at a 90 degree angle to form an inverted v-shape. Angle iron 230 extends between longitudinal support beams 65a and is positioned on third frame 60 such that rocker plate 240 intersects apex 236 of angle iron 230. The intersection of rocker plate 240 and angle iron 230 forms the point about which third frame 60 pivots during the pivot-dump mechanism.

Angle iron 230 can be secured to third frame 60 at a variety of different rotational angles depending on the amount of tilt required by third frame 60 to obtain the full dump position. This is largely a function of the distance from apex 236 to the ground. A greater distance will require a greater angle X, the angle between rocker plate 240 and trailing surface 232 of angle iron 230. This angle X is to permit sufficient tilt in third frame 60 to contact or nearly contact the ground. In a preferred embodiment, angle X is approximately 60 degrees.

In one aspect, a hardened metal wear plate 238 is welded to angle iron 230 to provide a contact surface for rocker plate 240. In this instance, rocker plate 240 is preferably made of a softer-grade steel than wear plate 238 which can aid in reducing the wear to rocker plate 240 caused by the pivotal movement of third frame 60. In a preferred embodiment, angle iron 230 is made of steel having 120K tensile strength.

Additionally, a retainer bracket 250 can be employed to prevent lateral movement of third frame 60 on rocker plate 240. As depicted in FIG. 8A, retainer bracket 250 includes a pair of attachment tabs 252, 254 and a clip 256 extending between tabs 252 and 254.

As depicted in FIG. 8C, the parts of pivoting means 200 can simultaneously be used in connection with an additional horizontal displacement means 100. For example, support plate 244 can form the attachment plate for roller 110. In this embodiment, roller 110 includes a central pin structure 111 that extends beyond each end of roller 110 and attaches to support plate 244 and plate 246 which is attached to longitudinal support beam 45a.

Dump trailer 10 may alternatively comprise vertical elevator means 300 in lieu of pivoting means 200 in order to achieve an elevator-dump mechanism. Incorporating vertical elevator means 300 into the design of dump trailer 10 to generally permit a greater dumping angle without increasing the distance between third frame 60 and the ground. Additionally, vertical elevator means 300 can be employed to increase ground clearance between the rear of third frame 60 and the ground in the fully articulated dump position without compromising the final dumping angle.

In one embodiment depicted in FIGS. 1D, 3C, and 12A-B, vertical elevator means 300 comprises two ramped tracks 312 attached to first frame 20, two roller arms 334 extending down from third frame 60, and elevator arm 320 extending between third frame 60 and second frame 40. In another embodiment depicted in FIGS. 1E, 3D, and 13A-C, vertical elevator means 300 comprises a series of stationary roller supports 314a, 314b, 314c attached to first frame 20, and an elevator arm 320 extending between second frame 40 and third frame 60. The structure and function of these components will be discussed in further detail below.

Referring now to FIG. 3C, vertical elevator means 300 comprises a pair of ramped tracks 312. Ramped tracks 312 are made of segments of rectangular metal tubing welded together and fixed to inner longitudinal support beams 25c of first frame 20. The profile of each ramped track 312 directs the upward articulation of third frame 60 during the dumping mechanism via roller arms 334 extending from third frame 60 as depicted in FIG. 5C. The construction of ramped tracks 312 is not limited to welded metal tubing nor is the shape limited to that depicted herein. By way of example, ramped tracks 312 may be fabricated from burned steel plate, which allows for various profile designs in order to optimize or modify the articulation of third frame 60 during the dumping mechanism. Modifying the angle of ramped tracks 312 permits an increase or decrease in the rate at which third frame 60 rotates in relation to the rate at which the tow vehicle backs up. Additionally, changing the shape of ramped track 312 allows third frame 60 to rotate at different rates as the dumping process progresses. Alternatively, a single ramp that extends between inner longitudinal support beams 65c could be used in lieu of separate ramped tracks 312. In this approach, additional roller arms 334 could be utilized to provide support in the center portion of third frame 60.

Figure 15:
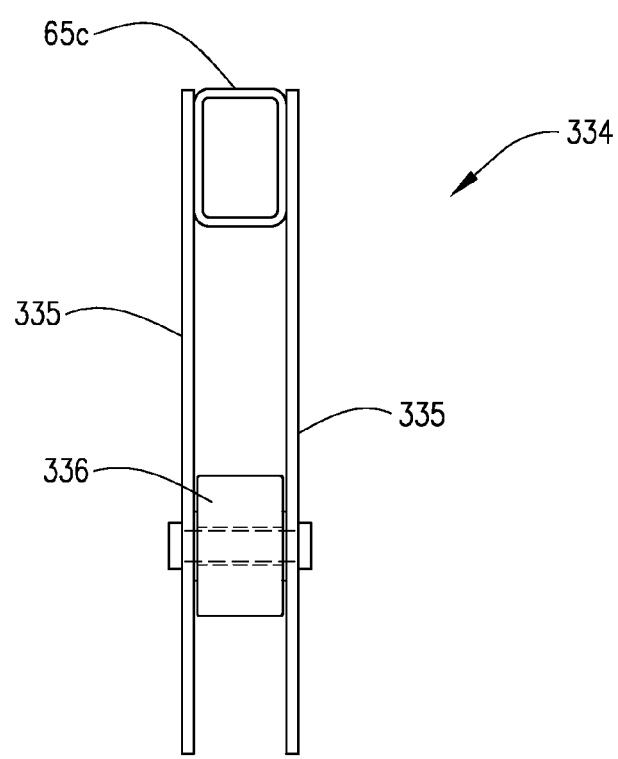
FIG. 15 is a front view of one embodiment of mobile roller arm.
Figure 15A:
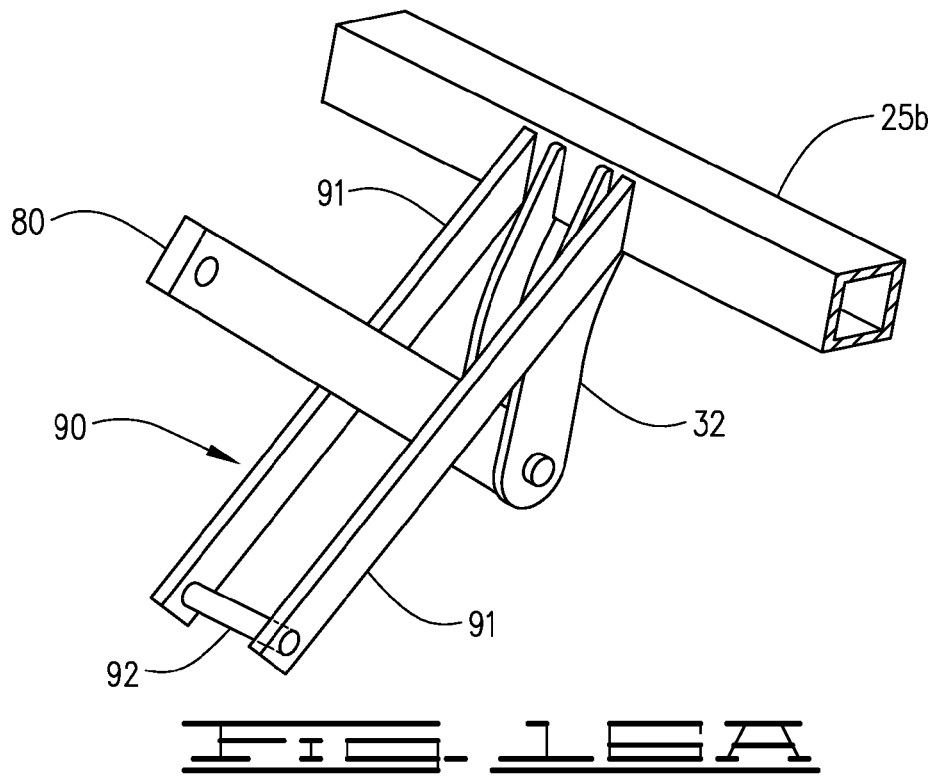
Figure 15B:
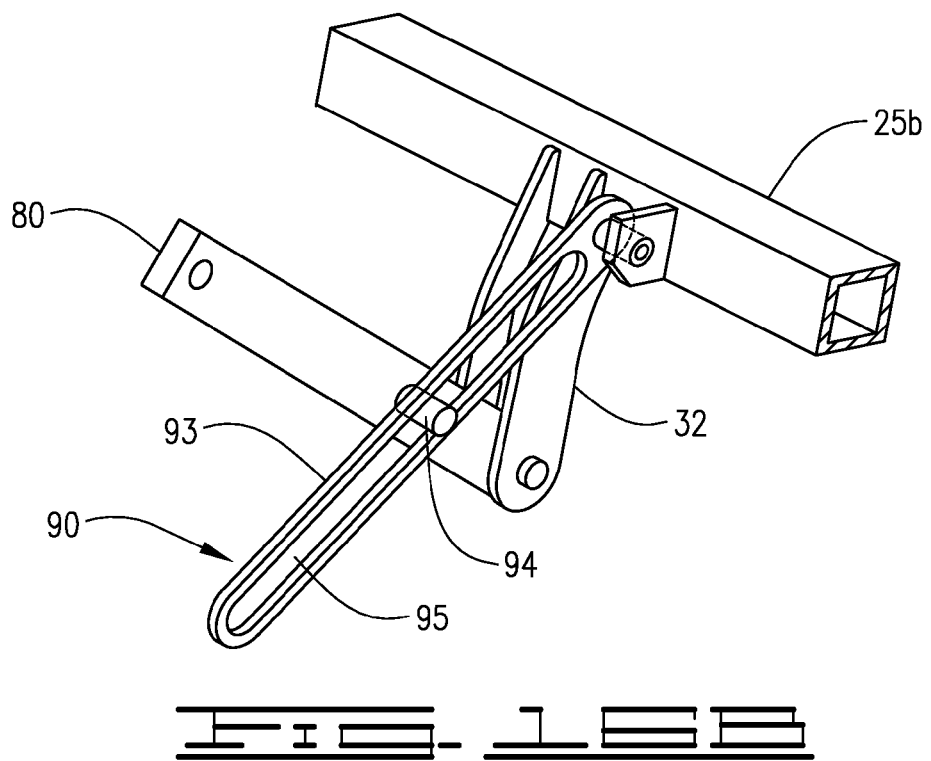

Referring now to FIG. 15, roller arms 334 comprise a pair of aligned flanges 335 extending from the side surfaces of an inside longitudinal support beam 65c. A roller 336 is attached between the ends of flanges 335 by a pin 337. Roller arms 334 are located such that rollers 336 contact ramped tracks 312 during the dumping mechanism. The length of roller arm 334 is largely a function of the shape of ramped track 312 and the distance between third frame 60 and first frame 20. Flanges 335 may extend beyond rollers 336 such that they flank either side surface of ramped track 312, thereby limiting the side to side movement of third frame 60.

In another embodiment, vertical elevator means 300 comprises a series of stationary roller supports 314a, 314b, 314c in lieu of the ramped track 312 and roller arms 334 described above. Stationary roller supports 314a, 314b, 314c provide progressive support surfaces as the third frame 60 articulates during the dumping mechanism. Referring now to FIG. 3D, stationary roller supports 314a, 314b, 314c are comprised of a pair of aligned support plates 315 of varying height extending from the side surfaces of longitudinal support beam 25a. A roller 316 is attached between the ends of support plates 315 by a pin 317. Stationary roller supports 314 are located such that rollers 316 contact longitudinal support beams 65a of third frame 60 as the dumping action progresses. The height of roller 316 from first frame 20 and the distance between successive stationary roller supports 314a, 314b, 314c may be adjusted to modify or optimize the articulation of third frame 60 during the dumping mechanism.

Figure 14:
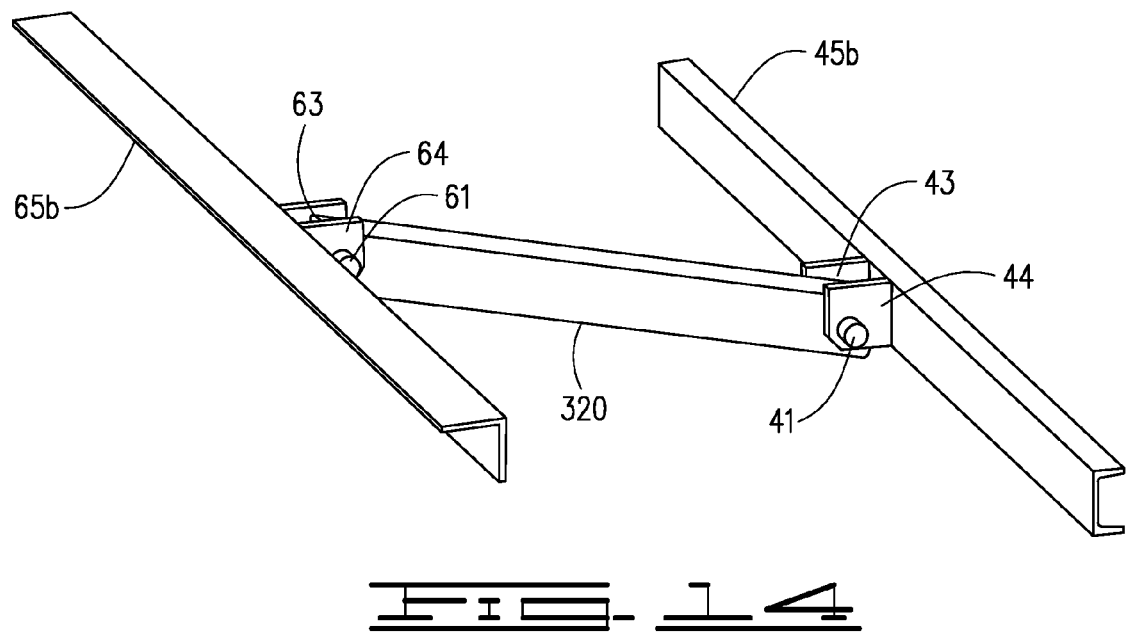
FIG. 14 is a perspective view of one embodiment of elevator arm.

Vertical elevator means 300 further comprises one or more elevator arms 320 which provide an upward force on the front portion of third frame 60 during rearward horizontal movement of second frame 40. Referring now to FIG. 14, elevator arm 320 can be made of rectangular metal tubing and is pivotally attached between attachment site 43 on second frame 40 and attachment site 63 on third frame 60. One embodiment of attachment sites 43, 63 comprises a pair of attachment plates 44, 64 extending from one or more support members 45, 65, respectively. In this embodiment, elevator arm 320 is attached between attachment plates 44, 64 by a pin 41, 61. The length of elevator arm 320 and the location of attachment sites 43, 63 may be adjusted to modify or optimize the articulation of third frame 60 during the elevator-dump mechanism. Although the embodiments described herein are directed to a single elevator arm 320, it should be appreciated that more than one elevator arm 320 could be employed.

Dump trailer 10 further comprises one or more rear torque arms 80. In a pivot-dump mechanism, rear torque arms 80 independently direct articulation of third frame 60 by applying a downward component force to the rear portion of third frame 60 as second frame 40 moves rearward horizontally. The downward component force is applied by rear torque arms 80 pivoting counterclockwise about their pivotal connection (referred to herein as lower torque arm pivot point 86) to first frame 20 thereby causing the rear portion of third frame 60 to articulate downward. In an elevator-dump mechanism, rear torque arms 80 act in concert with the vertical elevator means 300 to direct articulation of third frame up to a certain stop point. At the stop point, the downward movement provided by rear torque arms 80 ceases and the remaining dump articulation is directed by elevator arm 320 which provides an upward force on the front portion of third frame 60 thereby causing third frame 60 to pivot about its connection point to rear torque arms 80. This connection point is also referred to herein as the upper torque arm pivot point 88.

Figure 9A:
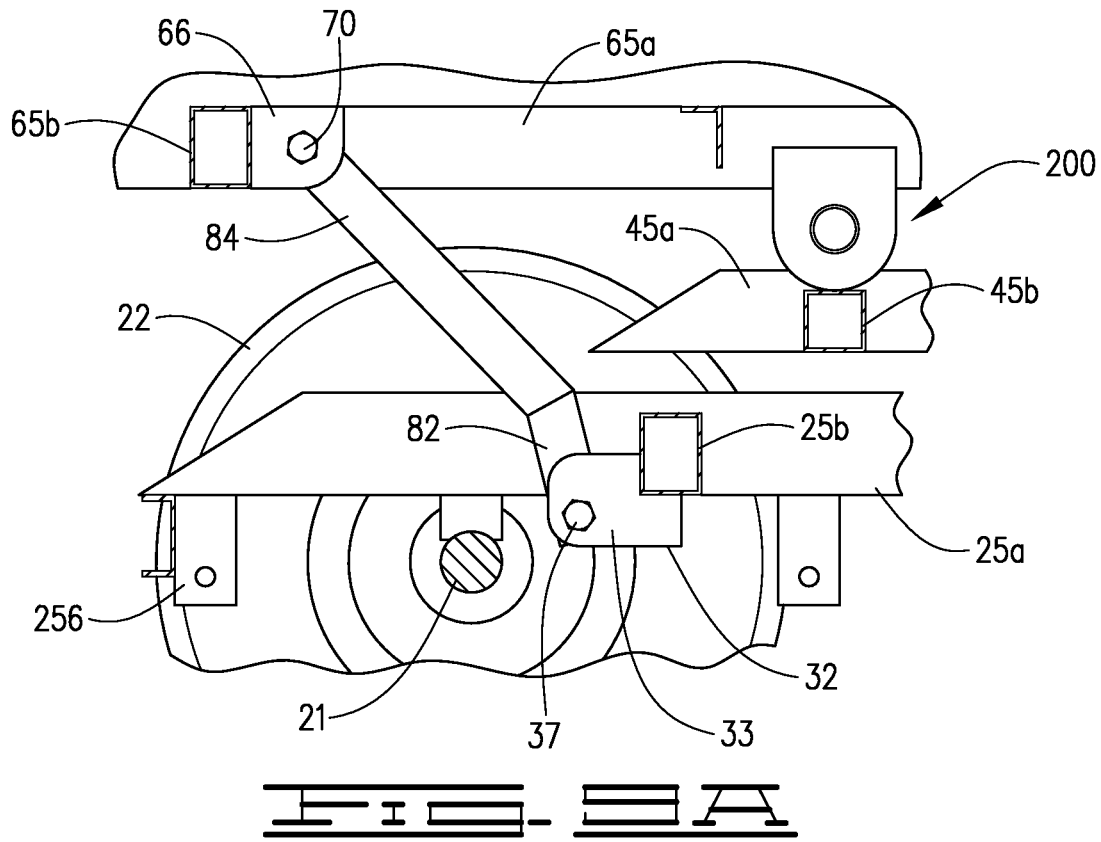
FIG. 9A is a side cross-sectional view of the rear portion of the trailer depicting one embodiment of a rear torque arm.
Figure 9B:
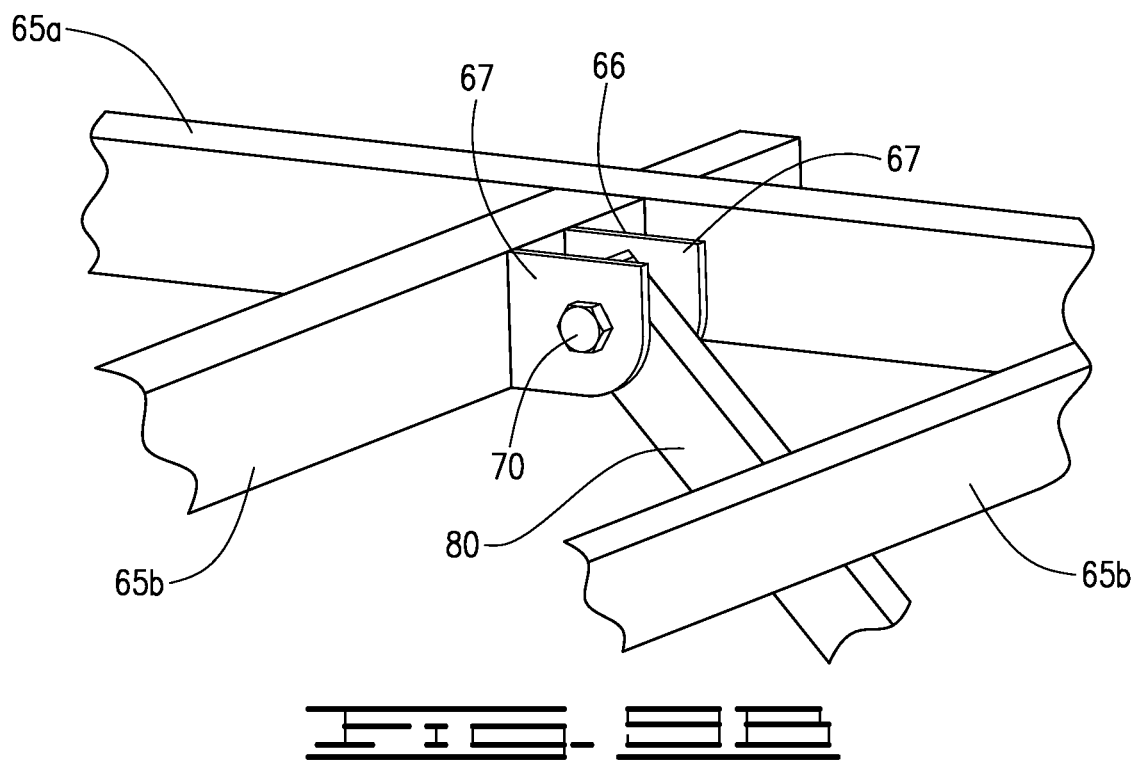
FIG. 9B is a close-up perspective view of the upper mounting bracket for one embodiment of the rear torque arm.

Referring now to FIG. 9A, rear torque arms 80 extend from the stationary first frame 20 to third frame 60 for a reverse-dump mechanism. Alternatively, in the forward-dumping configuration, rear torque arms 80 extend from the second frame 40 to third frame 60 as depicted in FIG. 11A. In the reverse dumping configuration, rear torque arms 80 are each coupled to first frame 20 via a lower mounting bracket 32 attached to lateral support beam 25b. Lower mounting bracket 32 comprises a pair of mounting plates 33 and 34 extending from lateral support 25b sufficient to house one end of rear torque arm 80. Rear torque arm 80 is secured between mounting plates 33, 34 by a pin or bolt 37 extending through plate openings 35, 36, wherein the pin or bolt 37 permits pivotal movement of rear torque arm 80. Each rear torque arm 80 extends from lower mounting bracket 32 on first frame 20 to a similar upper mounting bracket 66 on third frame 60. As demonstrated in FIG. 9B, upper mounting bracket 66 comprises two flanges 67 extending from lateral support 65b of third frame 60. Rear torque arms 80 are secured between flanges 67 by a pin or bolt 70 that extend through openings 69. The pin or bolt 70 should permit pivotal movement of the rear torque arm 80 relative to the bracket 66.

As depicted in FIG. 9A, one embodiment of pivoting arm 80 comprises a first arm portion 82 and a second arm portion 84. The first arm portion 82 is pivotally attached to the mounting bracket 32 of the first frame 20 whereas the second arm portion 84 is pivotally attached to mounting bracket 67 located on the third frame 60. In one embodiment, first arm portion 82 and second arm portion 40 are angled with respect to each other to provide clearance from rear axle 21 when third frame 60 is in the dumping position. Furthermore, the lengths of arm portions 82, 84 and the angle between arm portions 82, 84 can be adjusted as needed based on the particular arrangement adopted. In a separate embodiment depicted in FIG. 10A, arms 80 may comprise only a single, straight portion.

The embodiments of rear torque arm 80 described above are not meant to limit the scope of the invention. Rear torque arm 80 can be modified from these embodiments to fit a variety of different trailer dimensions and special needs so long as the rear torque arms 80 perform the intended function.

When an elevator-dump mechanism is employed, dump trailer 10 may further comprises a stopping means or stop member 90 to limit articulation or counterclockwise pivoting of rear torque arms 80 as second frame 40 moves horizontally rearward relative to first frame 20. In one embodiment, stop member 90 comprises a pair of fixed side plates 91 which extend at an angle downward from a support member 25b of first frame 20 and flank each side of rear torque arm 80. A pipe or tube 92 is positioned at the distal end between side plates 91 thereby preventing articulation of rear torque arm 80 beyond tube 92. In another embodiment, stop member 90 comprises a slotted plate 93 pivotally attached to the rear end portion of longitudinal support beam 25a. Each rear torque arm 80 further comprises a pin 94 that projects into slot 95 defined on slotted plate 93. In this embodiment, slotted plate 93 will pivot upward as rear torque arm 80 articulates downward via pin 94 progressing through slot 95 such that articulation of rear torque arm 80 ceases upon pin 94 reaching the end of slot 95. It should be appreciated that a stop member is not absolutely necessary where increased ground clearance of the rear portion of third frame 60 is not desired in the full dump position or when the desired dump angle can be achieved without limiting the articulation of rear torque arms 80.

Referring now to FIGS. 10A and 10B, the operation of a reverse-dumping configuration with a pivot-dump mechanism is initiated by the driver or passenger of tow vehicle immobilizes first frame 20 by initiating a brake mechanism to trailer wheels 22. Once the brake is set and the first frame 20 is immobilized, the driver backs the tow vehicle toward the stationary first frame 20 causing horizontal displacement of second frame 40 (as it is coupled to towing vehicle). In this embodiment, third frame 60 is coupled to second frame 40 via pivot subassembly 200 and moves with second frame 40. However, rear torque arms 80 prevent third frame 60 from moving in a linear fashion horizontally and rather, drive the rear portion of third frame 60 toward the ground thereby translating the horizontal movement of third frame to pivotal movement as depicted in FIG. 10B. The third frame continues to pivot or tilt about pivot subassembly 200 until the tow vehicle ceases backward movement. Thus, the third frame 60 can tilt or pivot to any degree and at any speed desired by the driver, which provides a significant advantage over previous designs. Once the payload is removed from trailer bed 62, the driver simply pulls the tow vehicle forward thereby returning third frame 60 to its original resting position and causing the front roller subassemblies 100 to contact flange 27 of the front lateral support beam 25b, thus preventing any further forward movement of second frame 40 relative to first frame 20. The driver then releases the trailer brake and proceeds on his way. In an alternative embodiment not shown, dump trailer can further comprise a pinable hatch or any type of locking device that could hold the second frame in place and prevent incidental horizontal movement during towing.

Figure 11B:
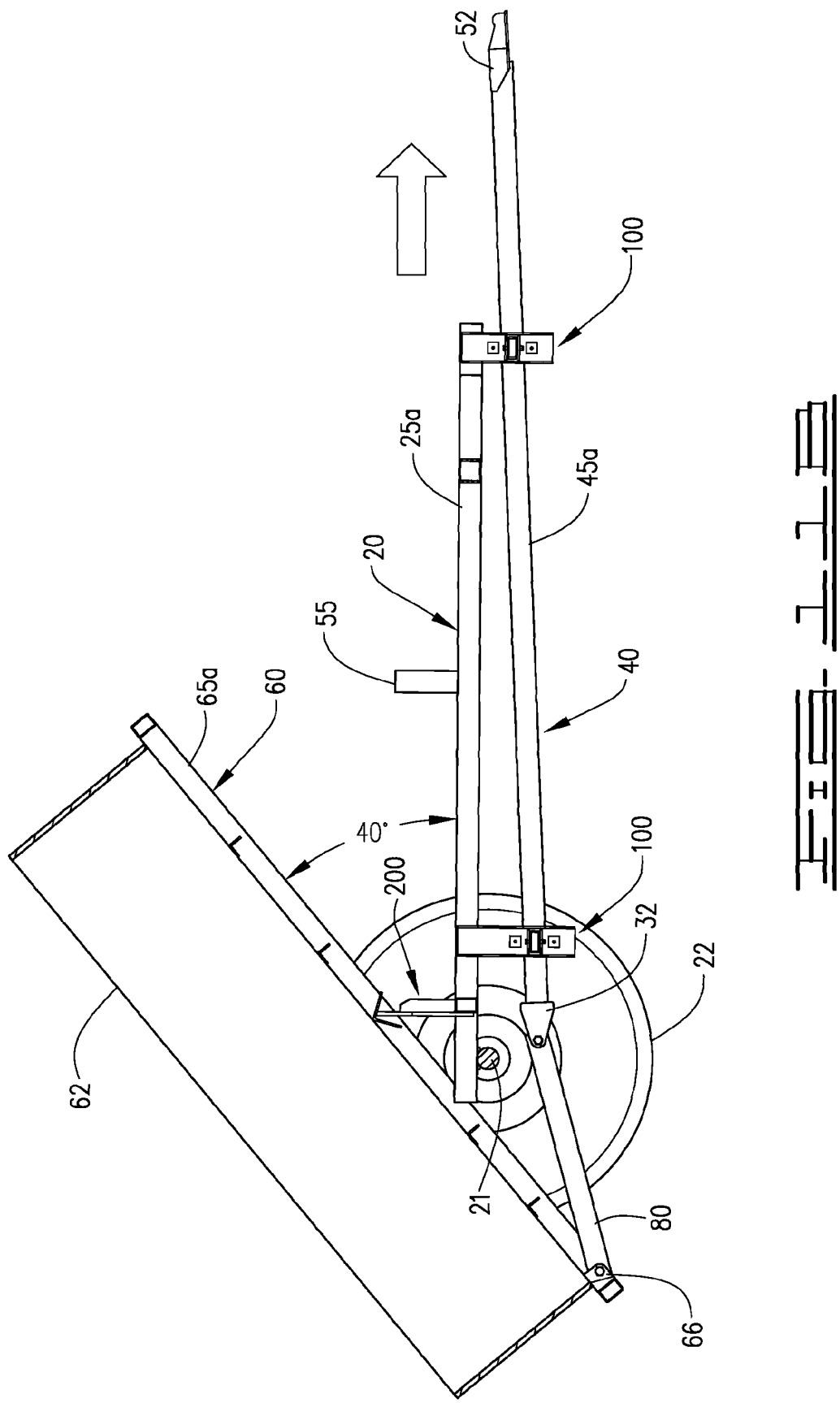
FIG. 11B is a cross-sectional side view of the embodiment of FIG. 1C in a dump position.

FIGS. 11A and 11B depict an example of a forward-dumping configuration with a pivot dump mechanism. The primary difference is that second frame 40 is disposed below first frame 20 and provides the attachment site for pivoting arm 80. In this configuration, upon immobilization of first frame 20, the driver pulls the tow vehicle forward causing second frame 40 to be displaced horizontally relative to first frame 20. As the second frame 40 moves forward, pivoting arm 80 pulls the rear portion of third frame 60 toward the ground, causing third frame 60 to pivot or tilt about pivot subassembly 200. It should be noted in this embodiment, third frame 60 is not displaced horizontally during the dumping action.

Figure 12A:
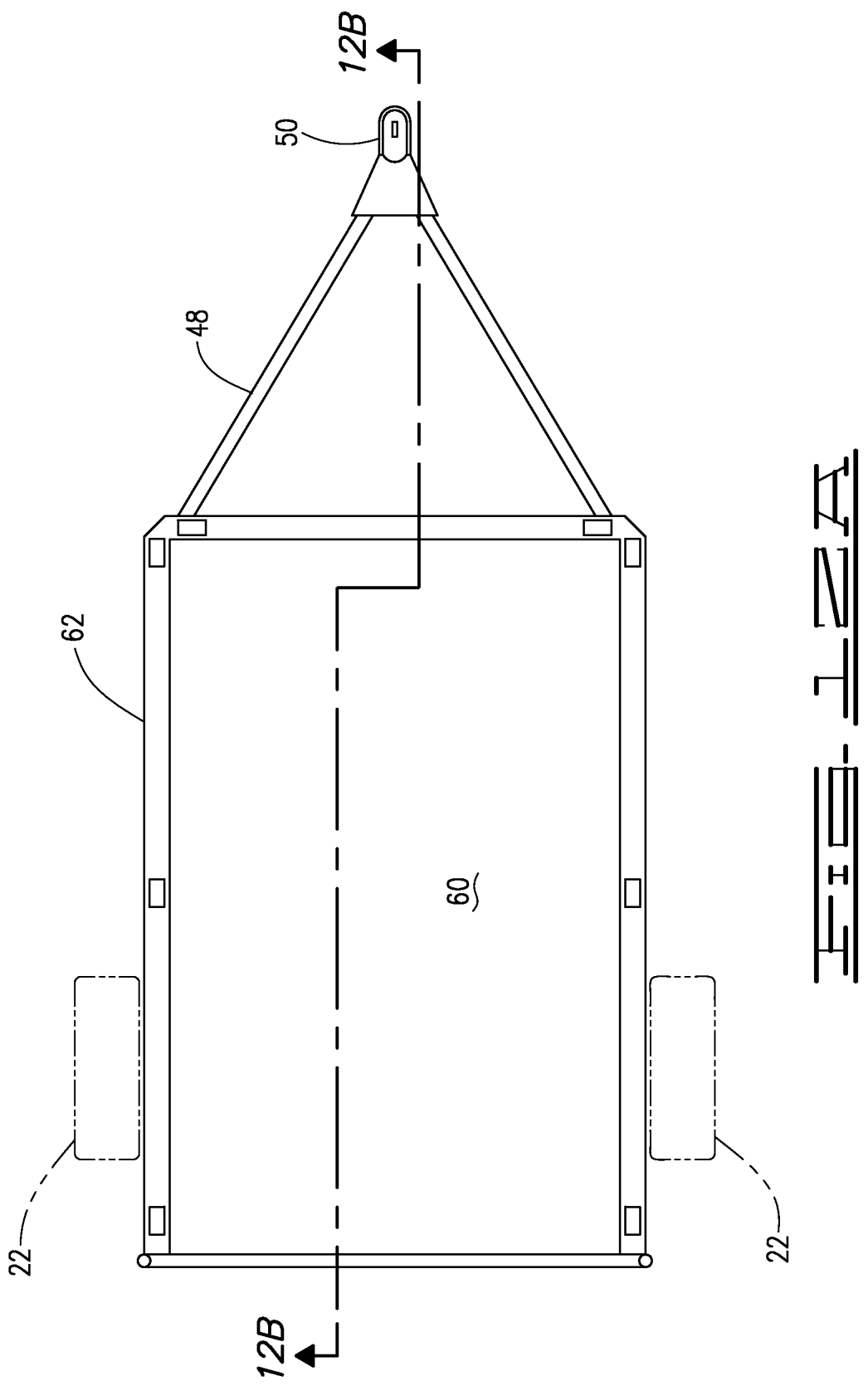
FIG. 12A is a top view of the dump trailer of FIG. 1D depicting the cross-sectional cut for the view depicted in FIGS. 12B and 12C.
Figure 12B:
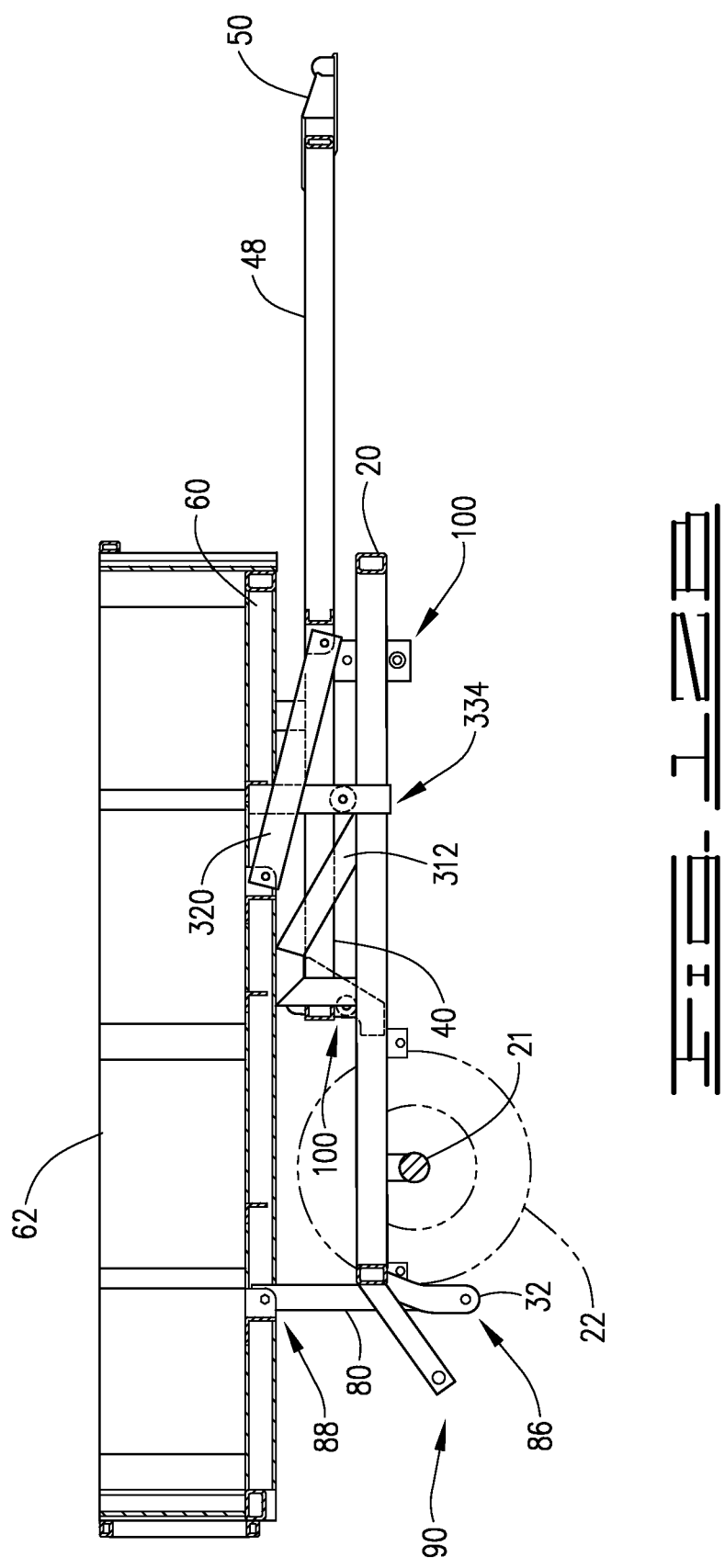
FIG. 12B is a side cross-sectional view of the embodiment of FIG. 1D in a tow position.

FIGS. 12A and 12B depict an example of a reverse-dumping configuration with an elevator dump mechanism. FIG. 12A shows dump trailer 10 in the starting or tow position. To initiate the dump mechanism, the operator immobilizes the first frame 20 by activating a brake mechanism on trailer wheels 22. The operator then backs the tow vehicle toward the stationary first frame 20 thereby causing second frame 40 to move horizontally rearward relative to first frame 20 via horizontal displacement means 100. Third frame 60 begins to move horizontally rearward with second frame 40 via elevator arm 320. However, this horizontal movement is translated to a tilting articulation of third frame 60 via a downward force applied to the rear of third frame 60 by the counterclockwise pivoting rear torque arms 80 and an upward force applied to the front portion of third frame 60 by vertical elevator means. More specifically, as the second frame 40 progresses rearward, the front portion of third frame 60 moves upward as roller arms 334 encounter ramped tracks 312. Once the counterclockwise pivoting of rear torque arms 80 ceases as a result of stop member 90, the horizontal rearward movement of second frame 40 translates to an upward component force applied to the front portion of third frame 60 via elevator arm 320. At this point, the upward component force supplied by elevator arm 320 is no longer counteracted by the downward component force at the rear of third frame 60 such that third frame 60 ultimately finishes the final dump articulation by pivoting about its connection (upper torque arm pivot point 88) to rear torque arms 80 as second frame 40 finishes its rearward horizontal progression. Thus, the articulation path of third frame 60 is modified by the stoppage of rear torque arms 80 thereby causing mobile roller arms 334 to lift off of ramped tracks 312. As a result, ground clearance with the rear of the fully articulated third frame 60 can be increased (since pivoting range of rear torque arms 80 is limited by stop member 90) as compared to the pivot-dump mechanism without sacrificing the final dump angle of third frame 60. Alternatively, if improved ground clearance is not an issue with a particular trailer design or not desired, the final dump angle can be increased using the elevator-dump mechanism by simply allowing a greater downward articulation of rear torque arms 80. Once the payload is removed from trailer bed 62, the driver simply pulls the tow vehicle forward thereby returning third frame 60 to its original resting position and causing the front vertical displacement means 100 to contact the front lateral support beam 25b, thus preventing any further forward movement of second frame 40 relative to first frame 20. The driver then releases the trailer brake and proceeds on his way.

Figure 13B:
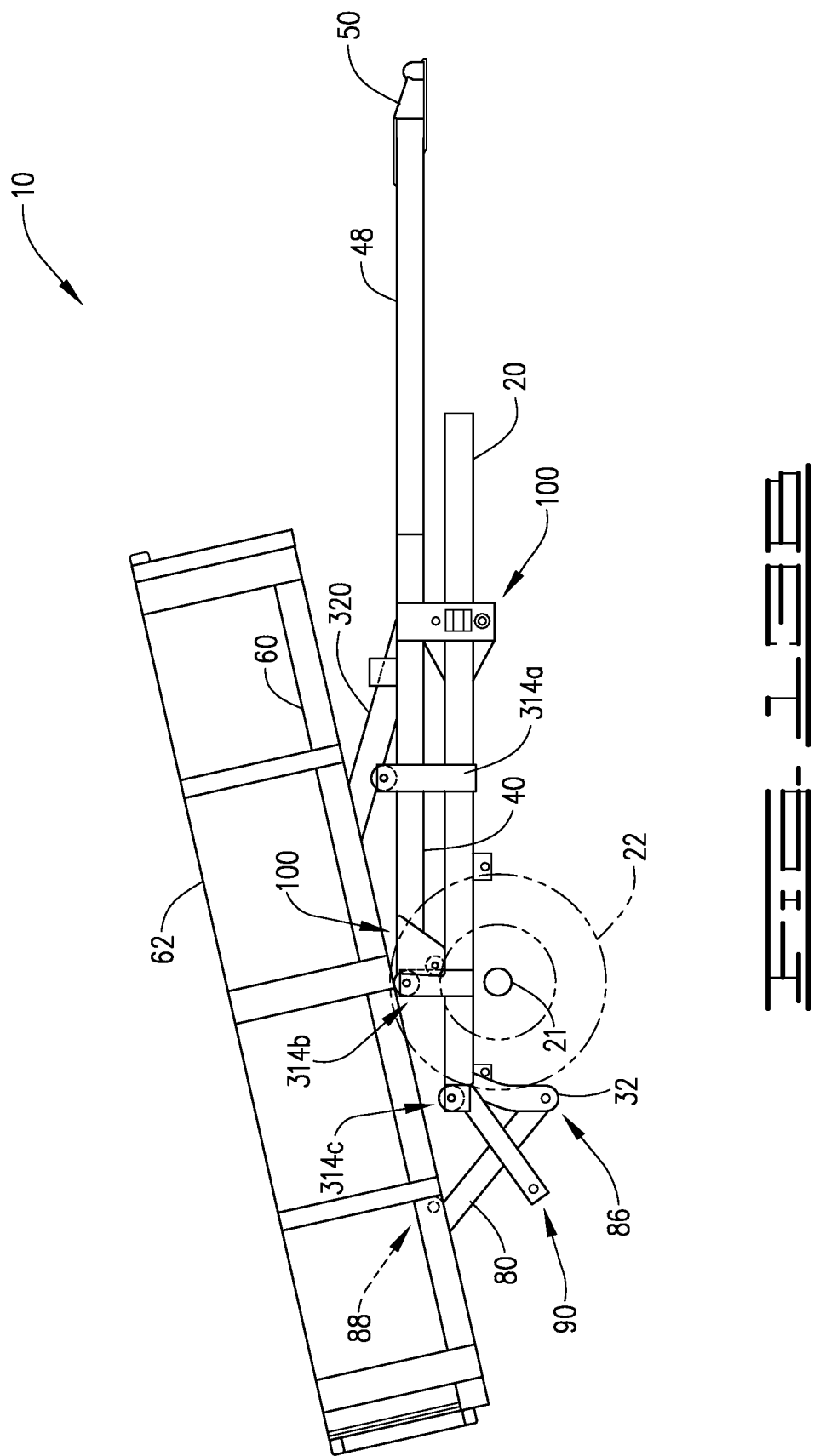
FIG. 13B is a side cross-sectional view of the embodiment of FIG. 1E in an intermediate dump position.

FIGS. 13A-C depict another example of a reverse-dumping configuration with an elevator-dump mechanism. FIG. 13A shows dump trailer 10 in the starting or tow position. To initiate the dump mechanism, the operator immobilizes the first frame 20 by activating a brake mechanism on trailer wheels 22. The operator then backs the tow vehicle toward the stationary first frame 20, thereby causing second frame 40 to move horizontally relative to first frame 20 via horizontal displacement means 100. The horizontal movement of second frame 40 is transferred to third frame 60 through elevator arm 320. The horizontal rearward movement of second frame 40 allows third frame 60 to pivot about the front stationary roller support 314a. Rear torque arms 80 simultaneously pull or drive the rear of third frame 60 downward while elevator arm 320 pushes the front of third frame 60 upward. Third frame 60 continues to roll rearward and pivots about front stationary roller support 314a until third frame 60 comes into contact with intermediate stationary roller support 314b, at which point third frame 60 loses contact with front stationary roller support 314a and continues to roll rearward and pivot about intermediate stationary roller support 314b as shown in FIG. 13B. This process is repeated as second frame 40 continues to move rearward causing third frame 60 to contact rear stationary roller support 314c. However, in this example, just prior to third frame 60 contacting rear stationary roller support 314c, rear torque arms 80 cease pivoting about lower torque arm pivot point 86 as a result of stop member 90 while elevator arm 320 continues to apply an upward force on the front portion of third frame 60. This causes a change in the dump trajectory. Namely, third frame 60 is caused to pivot about its connection to rear torque arms 80 (upper torque arm pivot point 88) until it reaches its final dump angle as shown in FIG. 13C. Once the payload is removed from trailer bed 62, the driver simply pulls the tow vehicle forward thereby returning third frame 60 to its original resting position and causing the front horizontal displacement means 100 to contact the front lateral support beam 25b, thus preventing any further forward movement of second frame 40 relative to first frame 20. The driver then releases the trailer brake and proceeds on his way.

It should be appreciated that the final dump angle or ground clearance achieved is a function of the combination of multiple variables including, but not limited to distance of third frame from ground, distance of first frame from ground, length of rear torque arms, distance of horizontal displacement of second frame during dump mechanism, and length of front elevator arm. Thus, the embodiments described herein are for illustration purposes and are not intended to unduly limit or restrict the spirit and scope of the invention set forth in the following claims.

What is claimed is:

1. A dump trailer comprising:
   a first frame, the first frame bearing one or more sets of wheels;
   a second frame, the second frame comprising an attachment device to permit coupling to a towing vehicle;
   a third frame positioned above the first and second frames and providing support for a trailer bed;
   horizontal displacement means for permitting horizontal forward and rearward movement of the second frame relative to the first frame, wherein the horizontal displacement means contacts the first frame and the second frame;
   pivoting means for providing a pivot point for the third frame as the second frame moves horizontally forward and rearward relative to the first frame;
   one or more rear torque arms, wherein the one or more rear torque arms cause the third frame to pivot about the pivoting means as the second frame moves forward and rearward relative to the first frame;
   wherein the first, second and third frames comprise one or more longitudinal support beams;
   wherein the second frame is positioned between the first frame and the third frame and;
   wherein the horizontal displacement means comprises a pair of attachment plates, an upper roller, and a lower roller, wherein the pair of attachment plates are coupled to a longitudinal support beam of the second frame and extend downward and flank opposite vertical side surfaces of a longitudinal support beam of the first frame, wherein the upper roller is positioned between and contacts a lower horizontal surface of said longitudinal support beam of the second frame and an upper horizontal surface of said longitudinal support beam of the first frame, and wherein the lower roller is positioned such that it contacts a lower horizontal surface of said longitudinal support beam of the first frame.

2. The dump trailer of claim 1, wherein the horizontal displacement means further comprises a side roller, wherein the attachment plates define an opening and wherein the side roller is positioned in the opening and contact vertical side edges of said longitudinal support beam of the first frame.

3. A dump trailer comprising:
   a first frame, the first frame bearing one or more sets of wheels;
   a second frame, the second frame comprising an attachment device to permit coupling to a towing vehicle;
   a third frame positioned above the first and second frames and providing support for a trailer bed;
   horizontal displacement means for permitting horizontal forward and rearward movement of the second frame relative to the first frame, wherein the horizontal displacement means contacts the first frame and the second frame;
   vertical elevator means for providing a component of upward force on a front portion of the third frame as the second frame moves horizontally rearward relative to the first frame; and
   a rear torque arm extending from a rear portion of the first frame to a rear portion of the third frame, wherein the rear torque arm provides a component of downward force on the rear portion of the third frame by pivoting counterclockwise about a lower torque arm pivot point as the second frame moves rearward relative to the first frame;
   wherein the vertical elevator means comprises:
      an elevator arm extending from a front portion of the second frame to the front portion of the third frame;
      a first and second ramped track, wherein the first ramped track is positioned on a first longitudinal support beam of the first frame and the second ramped track is positioned on a second longitudinal support beam of the first frame; and
      a first and second roller arm each comprising a roller, wherein the first roller arm extends down from a first longitudinal support beam of the third frame and the second roller arm extends down from a second longitudinal support beam of the third frame, wherein the first roller arm is positioned such that its roller contacts the first ramped track and the second roller arm is positioned such that its roller contacts the second ramped track as the second frame moves horizontally rearward relative to first frame.

4. The dump trailer of claim 3 further comprising a stopping means for limiting the counterclockwise pivoting of the rear torque arm.

5. A dump trailer comprising:
   a first frame connected to a plurality of wheels;
   a second frame adapted to attach to a towing vehicle; and
   a third frame attached to a trailer bed and positioned above the first and second frames;
   wherein one of the front or rear ends of the third frame raises in response to horizontal movement of the second frame and one of the first or second frames is positioned at least partially between the other two frames.

6. The dump trailer of claim 5 further comprising a roller positioned between the first and second frames that facilitates the horizontal movement of the second frame.

7. The dump trailer of claim 6, further comprising a top roller, a bottom roller, a first plate and second plate wherein the first and second plates are attached to the second frame and the top and bottom rollers are secured between the first and second plates.

8. The dump trailer of claim 5 further comprising a polymer positioned between the first and second frames that facilitates the horizontal movement of the second frame.

9. The dump trailer of claim 5, wherein the first frame remains stationary during the horizontal movement of the second frame.

10. The dump trailer of claim 5, wherein forward movement of the second frame moves the third frame into the dump position.

11. The dump trailer of claim 5, wherein rearward movement of the second frame moves the third frame into the dump position.

12. The dump trailer of claim 10, wherein the third frame remains in a fixed horizontal position as it tilts into the dump position.

13. The dump trailer of claim 11, wherein the third frame moves horizontally rearward as it tilts into the dump position.

14. A dump trailer comprising:
a first frame connected to a plurality of wheels;
a second frame adapted to attach to a towing vehicle;
a third frame attached to a trailer bed and positioned above the first and second frames; and
a torque arm extending from the first or second frame to the third frame;
wherein the torque arm applies downward force to the third frame in response to horizontal movement of the second frame.

15. The dump trailer of claim 14 wherein the torque arm rotates about is pivotally connected to the first or second frame.

16. The dump trailer of claim 14 further comprising a stop member attached to the first frame that limits the rotation of the torque arm.

17. The dump trailer of claim 14, wherein the downward force applied by the torque arm to the third frame causes the third frame to move into the dump position.

18. The dump trailer of claim 14, wherein the first frame remains stationary during the horizontal movement of the second frame.

19. A dump trailer comprising:
a first frame connected to a plurality of wheels;
a second frame adapted to attach to a towing vehicle;
a third frame attached to a trailer bed and positioned above the first and second frames; and
an elevator arm attached to the third frame and either the first or second frame;
wherein the elevator arm applies upward force to the third frame in response to horizontal movement of the second frame.

20. The dump trailer of claim 19, wherein forward movement of the second frame moves the third frame into the dump position.

21. The dump trailer of claim 19, wherein rearward movement of the second frame moves the third frame into the dump position.

22. The dump trailer of claim 19 wherein the elevator arm is pivotally attached to the second frame.

23. A dump trailer comprising:
a first frame connected to a plurality of wheels;
a second frame adapted to attach to a towing vehicle; and
a third frame attached to a trailer bed and positioned above the first and second frames;
wherein the third frame is configured to pivot about a connection to the second frame in response to horizontal movement of the second frame.

24. The dump trailer of claim 23, wherein forward movement of the second frame moves the third frame into the dump position.

25. The dump trailer of claim 23, wherein rearward movement of the second frame moves the third frame into the dump position.

26. The dump trailer of claim 23 further comprising a first vertical post, a second vertical post and a pipe, the vertical posts being attached to the second frame and the pipe connected to the vertical posts.

27. The dump trailer of claim 23 further comprising an angle iron secured to the third frame and a rocker plate secured to the first or second frame.

28. The dump trailer of claim 23, wherein the first frame remains stationary during the horizontal movement of the second frame.

* * * * *